(12) United States Patent
De Roeck et al.

(10) Patent No.: US 11,182,107 B2
(45) Date of Patent: Nov. 23, 2021

(54) SELECTIVE ALLOCATION OF REDUNDANT DATA BLOCKS TO BACKGROUND OPERATIONS

(71) Applicant: Western Digital Technologies, Inc., San Jose, CA (US)

(72) Inventors: Sam De Roeck, Ghent (BE); Stijn Devriendt, Knesselare (BE); Arne De Coninck, Erpe-Mere (BE); Thomas Demoor, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 104 days.

(21) Appl. No.: 16/683,968

(22) Filed: Nov. 14, 2019

(65) Prior Publication Data

US 2021/0149591 A1    May 20, 2021

(51) Int. Cl.
*G06F 12/00*    (2006.01)
*G06F 3/06*    (2006.01)

(52) U.S. Cl.
CPC ............ *G06F 3/0659* (2013.01); *G06F 3/064* (2013.01); *G06F 3/067* (2013.01); *G06F 3/0619* (2013.01); *G06F 3/0635* (2013.01); *G06F 3/0661* (2013.01)

(58) Field of Classification Search
CPC ........ G06F 3/0659; G06F 3/064; G06F 3/067; G06F 3/0635; G06F 3/0661; G06F 3/0619
USPC ........................................................ 711/154
See application file for complete search history.

(56) References Cited

U.S. PATENT DOCUMENTS

| | | | |
|---|---|---|---|
| 8,433,849 B2 | 4/2013 | De Schrijver et al. |
| 8,738,582 B2 | 5/2014 | De Schrijver et al. |
| 9,052,942 B1 | 6/2015 | Barber et al. |
| 9,244,967 B2 | 1/2016 | Provenzano et al. |
| 9,479,587 B2 | 10/2016 | Bestler et al. |
| 9,501,244 B2 | 11/2016 | Hayes et al. |
| 10,078,552 B2 | 9/2018 | De Keyser et al. |
| 2014/0122441 A1 | 5/2014 | Vervaet et al. |

*Primary Examiner* — Mardochee Chery
(74) *Attorney, Agent, or Firm* — Patent Law Works LLP

(57) ABSTRACT

Example distributed storage systems, controller nodes, and methods provide selective allocation of redundant data blocks to background operations. Background operations may be identified targeting a data unit stored in redundant data blocks in a storage pool with a plurality of storage elements. A subset of data units may be selected for the background operation and the system components including those data units may be isolated. Data requests to the isolated system components may be selectively prevented while the background operation executes on the subset of data units in the isolated system components.

20 Claims, 11 Drawing Sheets

SELECTIVE ALLOCATION OF REDUNDANT DATA BLOCKS TO BACKGROUND OPERATIONS

TECHNICAL FIELD

The present disclosure generally relates to data storage, and in a more particular example, to background operations in a distributed storage system using redundant data blocks.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

Large-scale storage systems generally distribute the stored data over multiple storage elements, such as for example solid state drives, or multiple components such as storage nodes comprising a plurality of such storage elements. However, as the number of storage elements in such a distributed storage system increase, the probability of failure of one or more of these storage elements increases, as does the probability of failure or interruption of controller, network, and interface components. To cope with these issue, distributed storage systems generally use some level of redundancy at the data, storage node, controller, interface, client, and network levels.

During a retrieval operation, only a subset of the redundant data blocks may need to be retrieved. Data blocks may be retrieved for normal data requests, such as a host read operation, as well as for background operations that may not directly relate to fulfillment of a host request, such as delete operations, garbage collection, replication, and other operations. In some configurations, both foreground operations, like host read and write operations, and background operations, like delete operations, may occur concurrently for the same data unit and the system may need to determine how such requests are going to be processed against the redundant data blocks corresponding to the data unit. Some distributed storage systems may seek to optimize foreground operations through storage policies directed to selection of particular data blocks for responding to a data request.

As large-scale storage systems scale, more reliable and efficient implementations for managing background operations in distributed storage systems with redundant data blocks may be needed.

SUMMARY

Various aspects for distributed and redundant data block storage, particularly, using selective allocation of redundant data blocks for background operations are described.

One general aspect includes a system that includes a plurality of storage elements configured to store a plurality of data blocks, where the plurality of data blocks includes a data unit set having a plurality of redundant data blocks corresponding to a data unit. The system also includes a background isolation engine configured to: identify a background operation targeting the data unit; select a background subset of data blocks from the data unit set of the plurality of data blocks; identify an isolated set of system components containing the background subset of data blocks; selectively prevent data requests from using the isolation set of system components during the background operation; and execute, using the background subset of data blocks in the isolated set of system components, the background operation.

Implementations may include one or more of the following features. The background isolation engine may be further configured to: identify a foreground subset of data blocks from the data unit set of the plurality of data blocks, where the background subset includes a first selection of redundant data blocks from which the data unit may be recovered, the foreground subset includes a second selection of redundant data blocks from which the data unit may be recovered, and the foreground subset excludes the background subset; and selectively execute, using the foreground subset, the data requests selectively prevented from using the isolated set of system components. The system may further include: an encoder configured to disassemble the data unit into a predetermined number of redundant data blocks comprising the data unit set for the data unit; a block spreader configured to distribute the predetermined number of redundant data blocks to the plurality of storage elements; a block clusterer configured to retrieve the background subset from the isolated set of system components for executing the background operation and retrieve a foreground subset for executing data requests prevented from using the isolated set of system components; and a decoder configured to assemble the data unit from the foreground subset without using the background subset. The background isolation engine may be further configured to: select the background subset for a plurality of background operations during an operating period; and select the foreground subset for a plurality of prevented data requests during the operating period. The system may further include a storage policy engine configured to identify at least one isolation policy rule for selectively preventing data requests from using the isolated set of system components and the background isolation engine may be further configured to select for prevention, using the at least one isolation policy rule, selected data requests from a plurality of data requests directed to the isolated set of system components during the background operation. The at least one isolation policy rule may be selected from: selecting a first portion of incoming storage requests for execution using the isolated set of system components and preventing a second portion of incoming storage requests using the isolated set of system components; preventing all incoming storage requests from using the isolated set of system components; selecting a first portion of incoming retrieval requests for execution using the isolated set of system components and preventing a second portion of incoming retrieval requests from using the isolated set of system components; preventing all incoming retrieval requests from using the isolated set of system components; preventing all incoming storage requests and retrieval requests from using the isolated set of system components; and preventing all incoming data requests that are not related to the background operation from using the isolated set of system components. The system may further include a storage policy engine configured to identify at least one selection policy rule for selecting the background subset and the background isolation engine may be further configured to select, using the at least one selection policy rule, the background subset from the data unit set of the plurality of data blocks. The at least one selection policy rule may be selected from: selecting the background subset based on a storage capacity after execution of the background operation; selecting the background subset sequentially from a moving subset of a predetermined number of data blocks from the data unit set; selecting the background subset at predetermined operating time intervals; selecting the background subset based on at least one parameter determined by a background operation type for the background operation; and selecting the background subset based on at least one parameter in metadata corresponding to progress through the background operation. The background isolation engine may be further configured to: identify at least one selection parameter from a metadata store related to the background operation; aggregate the at least one selection parameter into at least one aggregate parameter value; and use the at least one aggregate parameter value to select the background subset. The background isolation engine may be further configured to: store at least one progress parameter in an interim operation data store during execution of the background operation; and use the at least one progress parameter to select the background subset. The system may further include: a storage path estimator configured to calculate at least one system cost value for each storage element of the plurality of storage elements storing the data unit set of data blocks and modify the at least one system cost value for each storage element including at least one data block in the background subset; and a storage path selector configured to select, based on a comparison of the at least one system cost value for each storage element, a request data set, where the request data set for the background operation includes storage elements including the background subset and the request data set for prevented data requests excludes storage elements including the background subset.

Another general aspect includes a computer-implemented method that includes: storing a plurality of data blocks in a plurality of storage elements, where the plurality of data blocks includes a data unit set having a plurality of redundant data blocks corresponding to a data unit; identifying a background operation targeting the data unit; selecting a background subset of data blocks from the data unit set of the plurality of data blocks; identifying an isolated set of system components containing the background subset of data blocks; selectively preventing data requests from using the isolated set of system components during the background operation; and executing, using the background subset of data blocks in the isolated set of system components, the background operation.

Implementations may include one or more of the following features. The computer-implemented method may include: identifying a foreground subset of the data unit set of the plurality of data blocks, where the background subset includes a first selection of redundant data blocks from which the data unit may be recovered, the foreground subset includes a second selection of redundant data blocks from which the data unit may be recovered, and the foreground subset excludes the background subset; and selectively executing, using the foreground subset, data requests selectively prevented from using the isolated set of system components. The computer-implemented method may include: disassembling the data unit into a predetermined number of redundant data blocks may include the data unit set for the data unit; distributing the predetermined number of redundant data blocks to the plurality of storage elements; retrieving the background subset for executing the background operation; retrieving a foreground subset for executing data requests prevented from using the background subset; and assembling the data unit from the foreground subset without using the isolated set of system components. The computer-implemented method may include: selecting the background subset for a plurality of background operations during an operating period; and selecting the foreground subset for a plurality of prevented data requests during the operating period. The computer-implemented method may include: executing, using the background subset, the plurality of background operations during the operating period; and executing, using the foreground subset, the plurality of prevented data requests during the operating period, wherein executing the plurality of background operations is simultaneous with executing the plurality of prevented data requests during the operating period. The computer-implemented method may include: identifying at least one isolation policy rule for selectively preventing data requests from using the isolated set of system components; and selecting for prevention, using the at least one isolation policy rule, selected data requests from a plurality of data requests directed to the isolated set of system components during the background operation. The at least one isolation policy rule may be selected from: selecting a first portion of incoming storage requests for execution using the isolated set of system components and preventing a second portion of incoming storage requests using the isolated set of system components; preventing all incoming storage requests from using the isolated set of system components; selecting a first portion of incoming retrieval requests for execution using the isolated set of system components and preventing a second portion of incoming retrieval requests from using the isolated set of system components; preventing all incoming retrieval requests from using the isolated set of system components; preventing all incoming storage requests and retrieval requests from using the isolated set of system components; and preventing all incoming data requests that are not related to the background operation from using the isolated set of system components. The computer-implemented method may include: identifying at least one selection policy rule for selecting the background subset; and selecting, using the at least one selection policy rule, the background subset from the data unit set of the plurality of data blocks. The at least one selection policy rule is selected from: selecting the background subset based on storage capacity after execution of the background operation; selecting the background subset sequentially from a moving subset of a predetermined number of data blocks from the data unit set; selecting the background subset at predetermined operating time intervals; selecting the background subset based on at least one parameter determined by a background operation type for the background operation; and selecting the background subset based on at least one parameter in metadata corresponding to progress through the background operation. The computer-implemented method may include: identifying at least one selection parameter from a metadata store related to the background operation; aggregating the at least one selection parameter into at least one aggregate parameter value; and using the at least one aggregate parameter value to select the background subset. The computer-implemented method may include: storing at least one progress parameter in an interim operation data store during execution of the background operation; and using the at least one progress parameter to select the background subset. The computer-implemented method may include: calculating at least one system cost value for each storage element of the plurality of storage elements storing the data unit set of data blocks; modifying the at least one system cost value for each storage element including at least one data block in the background subset; and selecting, based on a comparison of the at least one system cost value for each storage element, a request data set, where the request data set for the background operation includes storage elements including the background subset and the request data set for prevented data requests excludes storage elements including the background subset.

Another general aspect includes a system that includes a plurality of storage elements configured to store a plurality of data blocks, where the plurality of data blocks includes a data unit set having a plurality of redundant data blocks corresponding to a data unit. The system also includes: means for identifying a background operation targeting the data unit; means for selecting a background subset of data blocks from the data unit set of the plurality of data blocks; means for identifying an isolated set of system components containing the background subset of data blocks; means for selectively preventing data requests from using the background subset during the background operation; and means for executing, using the background subset, the background operation.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the management and resource allocation for background operations, such as by selecting data block subsets for background operations and selectively preventing data requests from using those data blocks during background operations. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

During storage, each data unit, such as a data object or data file, may be distributed in the form of a plurality of data blocks with a particular redundancy level on a plurality of storage elements in a distributed storage system (DSS). The data blocks may be spread in accordance with a spreading policy, which assures that the data blocks are spread suitably at different levels of the hierarchy of the DSS. In this way the data blocks will be spread on different storage elements, on different storage nodes, on different racks, on different sites, etc. of the DSS, in line with the desired spreading policy.

Selection of subsets of data block for performing various operations may be useful for optimizing and reducing the impact of background processes on the performance of the DSS. It may be especially useful for managing background processes related to, for example, delete operations, which impact all, or a large number of data blocks of a data object stored in the DSS. While example embodiments may be explained in terms of background processes for delete operations, alternative embodiments are possible for other background processes involving other operations with an impact on a large number of data blocks spread throughout the DSS, such as replication, garbage collection, etc.

A specific subset of storage elements may be selected for executing background operations, while the foreground operations continue by making use of another subset of the storage elements. In this way, both the background and foreground operations can be executed most efficiently as uncontrolled interference of both processes on the load/efficiency of the storage elements is reduced. In this way, the subset of storage elements for the background processes can, for example, be fully loaded with the execution of delete operations, or other background maintenance tasks, such that these can be completed in a shorter time period. The performance of the subset of storage elements for the foreground processes may not be impacted by the background processes while processing foreground storage and retrieval requests. In this way, overall efficiency, reliability, predictability, and consistency of the DSS may be increased.

Figure 1:
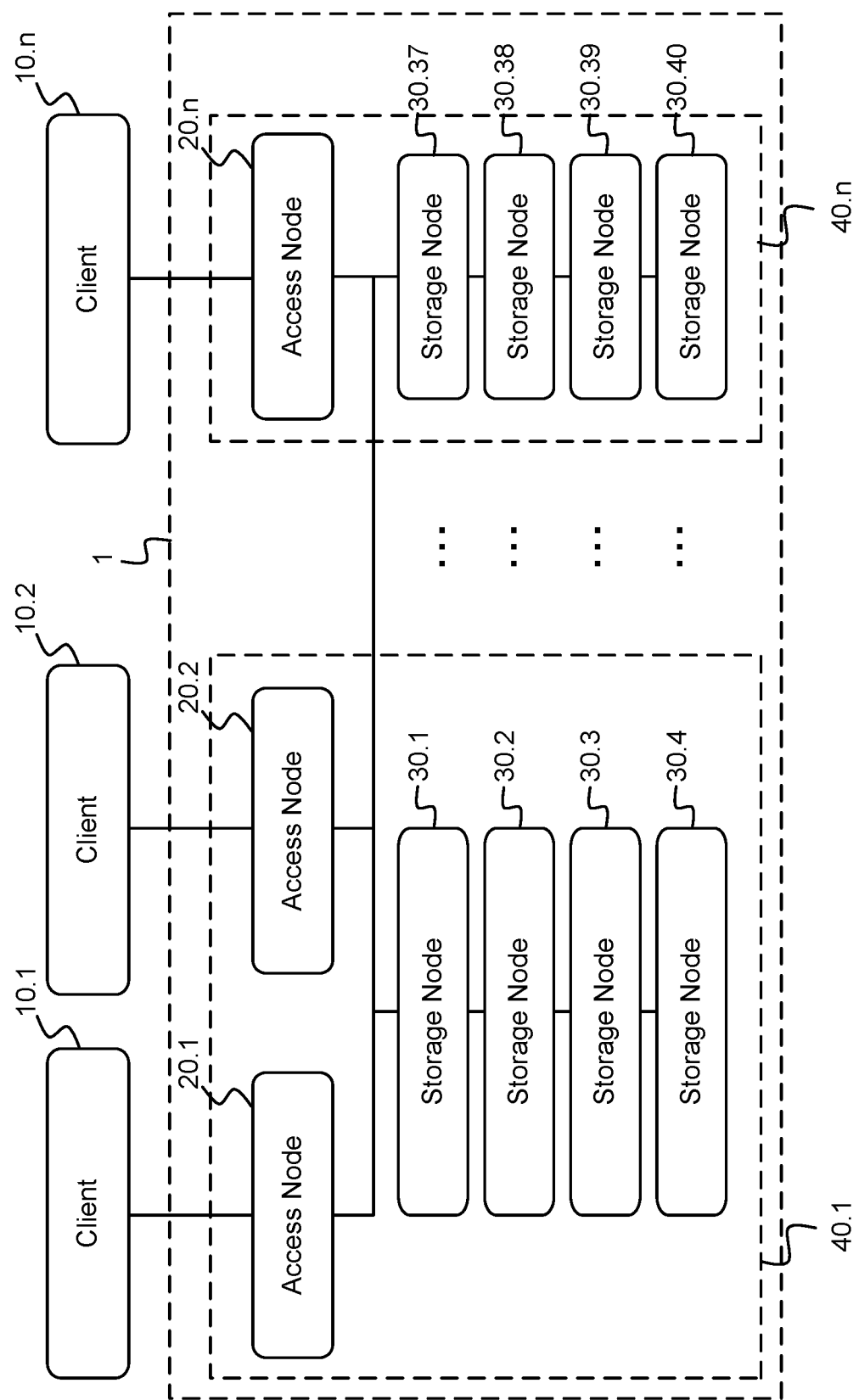
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.*n* for accessing data objects through one or more access nodes 20.1-10.*n*. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
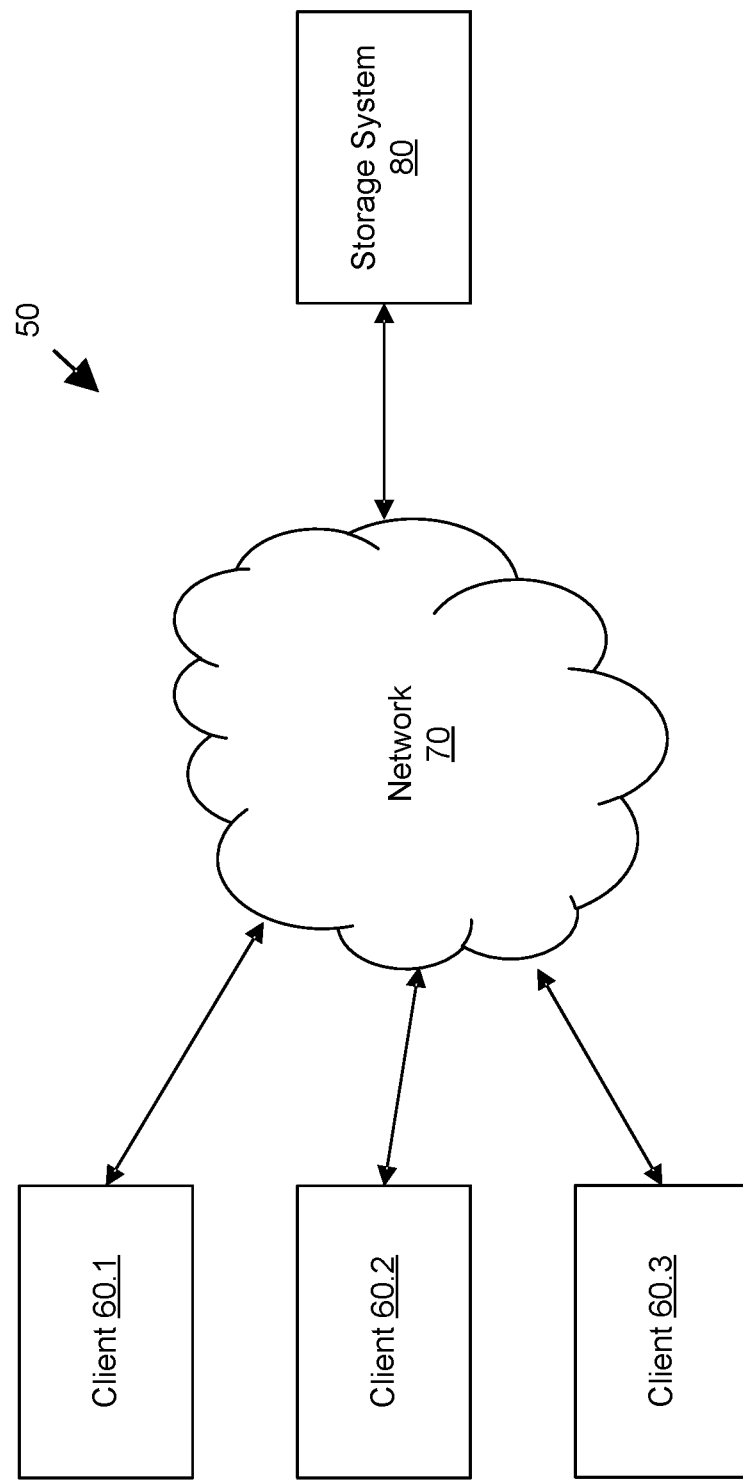
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
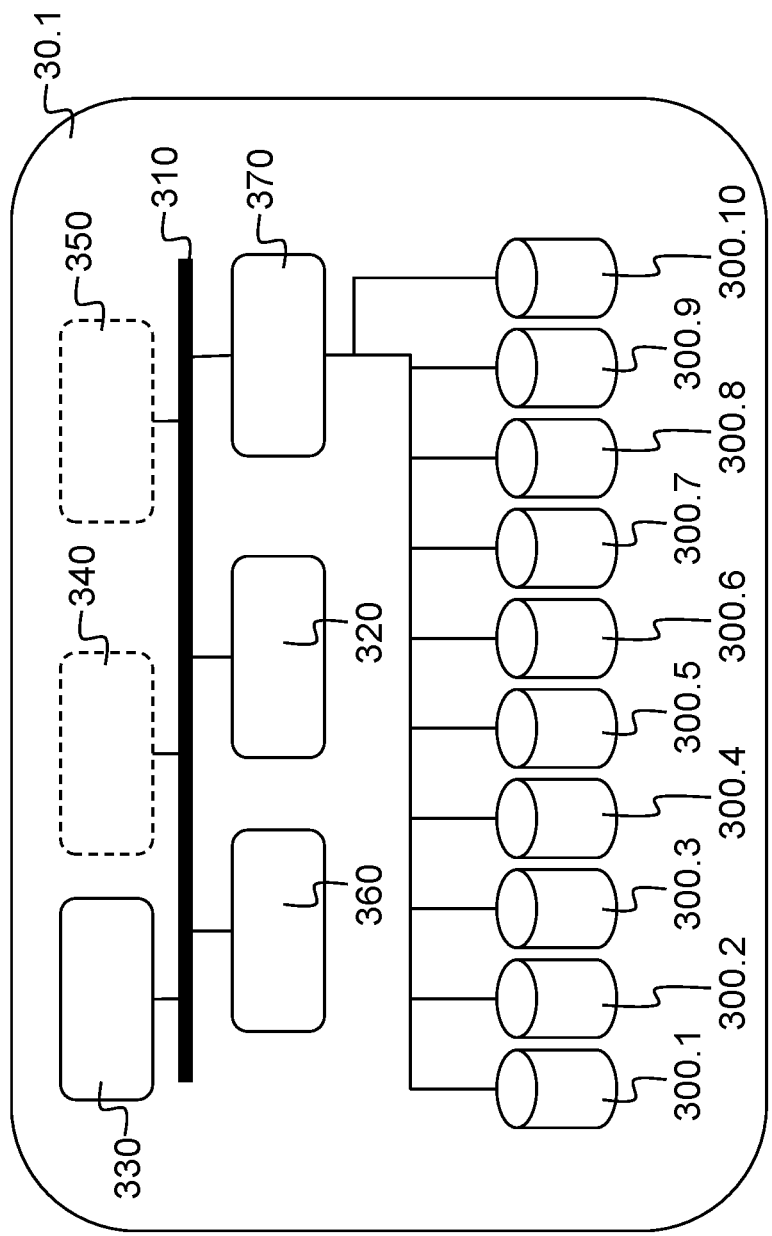
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 3 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronized. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
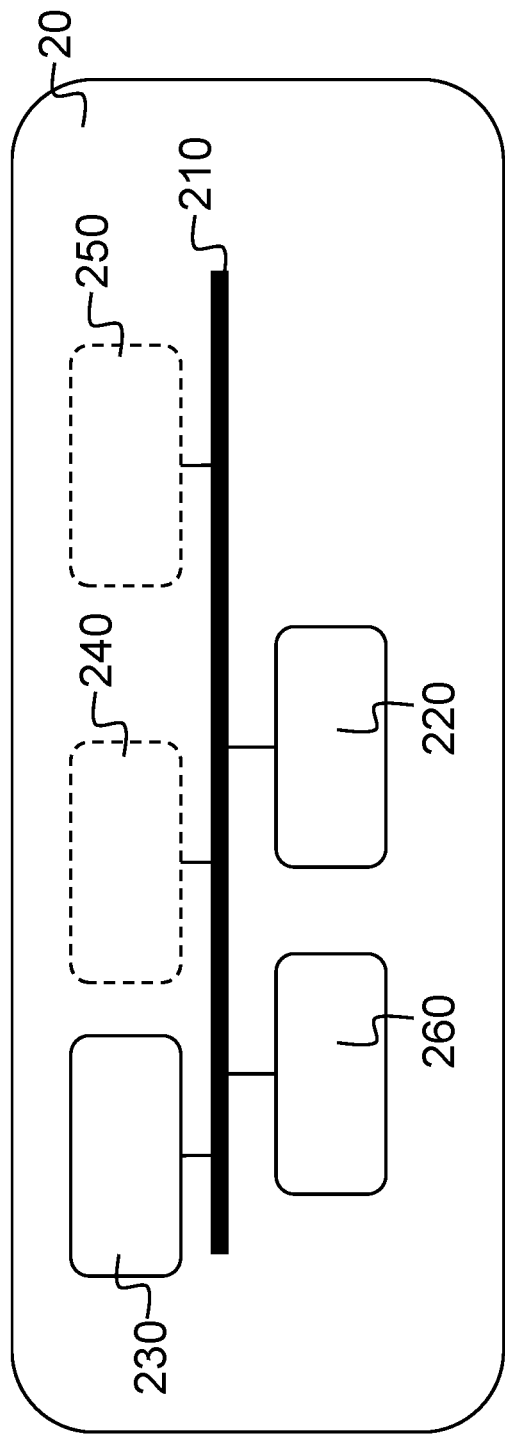
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, configuration management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
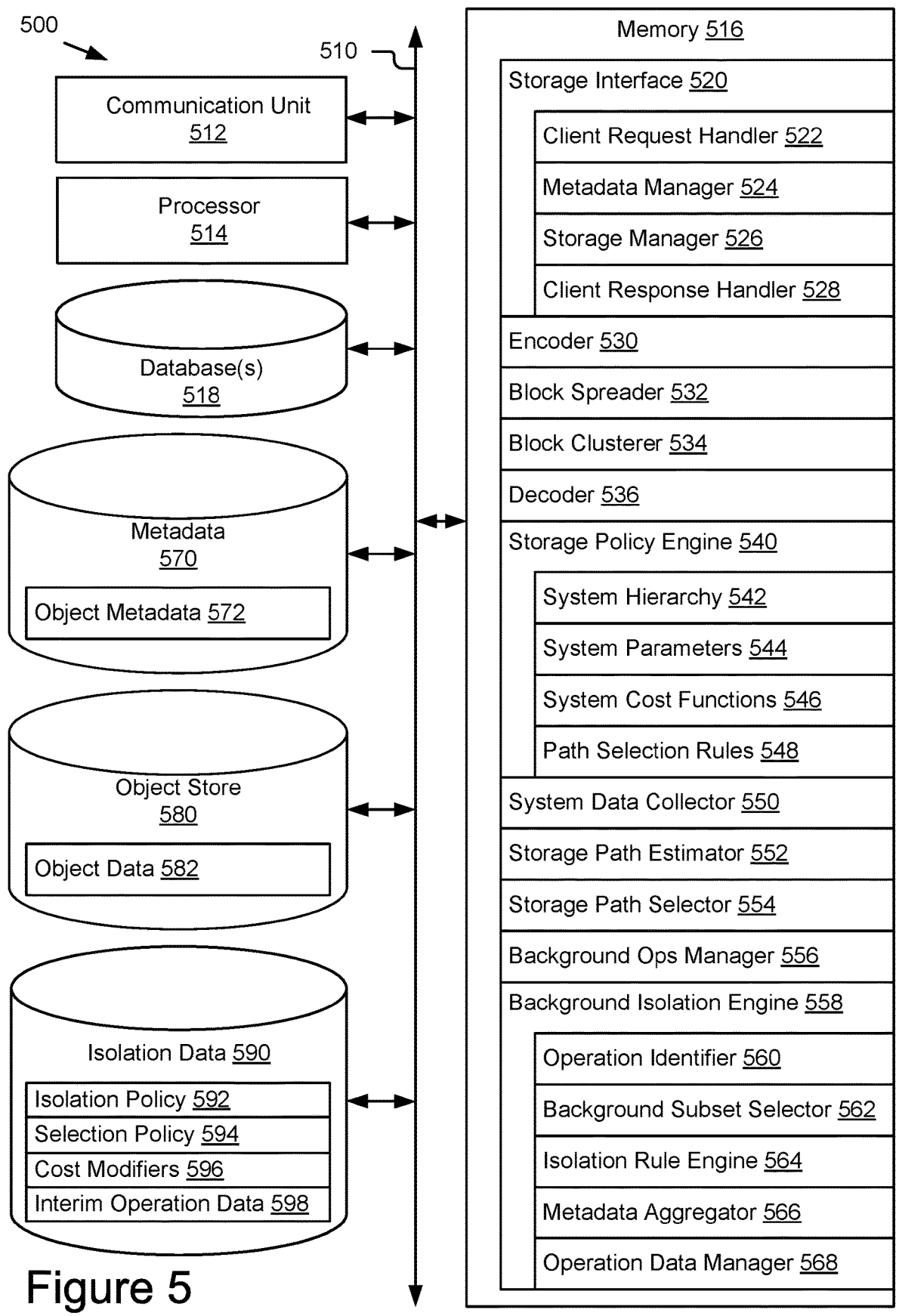
FIG. 5 schematically illustrates some example elements of an object storage system for the distributed storage system of FIG. 1.

FIG. 5 schematically shows selected modules of an access node, storage node, and/or controller node with storage management functions for distributed data block storage and access. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in a controller node 20 with object storage management functions and metadata store 570 and/or object store 580 may be embodied in one or more storage nodes 30 in communication with controller node 20.

Object storage system 500 may include a bus 510 interconnecting at least one communication unit 512, at least one processor 514, and at least one memory 516. Bus 510 may include one or more conductors that permit communication among the components of object storage system 500. Communication unit 512 may include any transceiver-like mechanism that enables object storage system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such metadata store 570, object store 580, and/or isolation data 590. Databases may include one or more data structures for storing, retrieving, indexing, searching, filtering, etc. of structured and/or unstructured data elements. In some embodiments, metadata store 570 may be structured as reference data entries and/or data fields indexed by metadata key value entries related to data objects stored in object store 580. Object store 580 may include data objects comprised of object data (such as host data), some amount of metadata (stored as metadata tags), and a GUID. Metadata store 570, object store 580, and/or other databases or data structures may be maintained and managed in separate computing systems, such as storage nodes, with separate communication, processor, memory, and other computing resources and accessed by object storage system 500 through data access protocols. Metadata store 570 and object store 580 may be shared across multiple object storage systems 500.

Object storage system 500 may include a plurality of modules or subsystems that are stored and/or instantiated in memory 516 for execution by processor 514. For example, memory 516 may include a storage interface 520 configured to receive, process, and respond to object data requests from client systems or other nodes in distributed storage system 1. Memory 516 may include an encoder 530 configured to disassemble data objects into a plurality of data blocks, such as data shards or symbols for an erasure coding configuration. Memory 516 may include a block spreader 532 configured to distribute the data blocks among a plurality of storage nodes or storage elements according to a spreading policy. Memory 516 may include a block clusterer configured to retrieve a subset of distributed data blocks for reassembling the data object. Memory 516 may include a decoder configured to reassemble the data object from the retrieved data blocks and the encoding configuration used. Memory 516 may include a storage policy engine 540 configured to define one or more storage policies based on system cost models for use in selecting storage elements, including a blacklisting policy. Memory 516 may include a system data collector 550 configured to receive system cost parameters for calculation of system costs. Memory 516 may include a storage path estimator 552 configured to calculate system costs for each storage path. Memory 516 may include a storage path selector 554 configured to select a storage element based on comparing system costs for each storage path. Memory 516 may include a background operations manager 556 configured to execute background processes against a background subset of data blocks. Memory 516 may include a background isolation engine 558 configured to support background operations manager 556 and selectively prevent access to the background subset during background operations. In some embodiments, encoder 530, block spreader 532, block clusterer 534, decoder 536, storage policy engine 540, system data collector 550, storage path estimator 552, storage path selector 554, background operations manager 556, and/or background isolation engine 558 may be integrated into storage interface 520 and/or managed as separate libraries or background processes (e.g. daemon) through an API or other interface.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects and their respective client or host data and metadata in accordance with the protocols of an object storage system.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client response handler 528.

Client request handler 522 may include an interface and/or communication event-based condition for receiving object data requests from one or more clients. For example, client systems may send an object data request over a network connection and addressed to object storage system 500 or a port or component thereof. Client request handler 522 may receive these requests and parse them according to the appropriate communication and object storage protocols. For example, client request handler 522 may identify a transaction identifier, a client identifier, an object identifier (object name or GUID), a data operation, and additional parameters for the data operation, if any, from the received message or messages that make up the object data request.

Metadata manager 524 may include interfaces, functions, and/or parameters for creating, modifying, deleting, accessing, and/or otherwise managing object metadata, such as object metadata 572 stored in metadata store 570. For example, when a new object is written to object store 580, at least one new metadata entry may be created in metadata store 570 to represent parameters describing or related to the newly created object. Metadata manager 524 may generate and maintain an object data index that enables metadata manager 524 to locate object metadata within metadata store 570. For example, metadata store 570 may be organized as a key-value store and object data index may include key values for data objects and/or operations related to those objects that are indexed with a key value that include the object identifier or GUID for each object. In some embodiments, metadata manager 524 may also manage object metadata stored in object store 580 with object data 582.

Metadata manager 524 may work in conjunction with storage manager 526 to create, modify, delete, access or otherwise manage object metadata stored as object tags within object store 580.

Storage manager 526 may include interfaces, functions, and/or parameters for reading, writing, and deleting object data elements in object store 580. For example, object PUT commands may be configured to write object identifiers, object data 582, and/or object tags to object store 580. Object GET commands may be configured to read data from object store 580. Object DELETE commands may be configured to delete data from object store 580, or at least mark a data object for deletion until a future garbage collection or similar operation actually deletes the data or reallocates the physical storage location to another purpose.

Other object storage commands may be handled by storage manager 526, including special functions defined for version control. Object storage commands processed by storage manager 526 may include parameters for accessing special functions and/or metadata resources stored with host or client data in the data objects. Storage manager 526 may work in conjunction with metadata manager 524 for managing object metadata, including versioning information. Storage manager 526 may operate in conjunction with encoder 530, block spreader 532, block clusterer 534, and decoder 536 for encoding and decoding data objects in redundant and distributed data blocks in accordance with an erasure coding configuration or other data redundancy method. For example, storage manager 526 may use encoder 530 and block spreader 532 to write data to object store 580 and use block clusterer 534 and decoder 536 to read data from object store 580. Encoder 530, block spreader 532, block clusterer 534, and decoder 536 may in turn use storage policy engine 540, system data collector 550, storage path estimator 552, storage path selector 554, background operations manager 556 and background isolation engine 556 to select which storage elements within a given set of storage elements should be used for such write and/or read operations.

Client response handler 528 may include an interface and/or communication logic for sending response messages, such as result, status, or error messages, to one or more clients related to object data requests received. For example, client response handler 528 may wait for processing by metadata manager 524 and/or storage manager 526 to complete or generate an error, and then provide an appropriate result or error message to the client system(s) for each object data request received In some embodiments, metadata store 570 may be distributed across multiple systems, such as a plurality of access systems. Metadata store 570 and/or portions thereof may be sharded data stores, wherein the data stores are partitioned into segments stored in different computing systems. Storage interface 520 may include the functions for locating and accessing relevant portions of the sharded data base.

Encoder 530, block spreader 532, block clusterer 534, and decoder 536 may comprise an erasure coding engine configured to store data objects in accordance with a reliability policy which guarantees a level of redundancy. Encoder 530, block spreader 532, block clusterer 534, and decoder 536 may individually or collectively include an interface protocol or set of functions and parameters for distributing data blocks corresponding to data objects across designated sets of storage nodes and storage elements and reassembling those data objects from subsets of those sets (allow for failures, errors, interruptions, and optimizations). For example, object storage system 500 may correctly retrieve a data object distributed among storage elements even if a number of those storage elements have failed or are otherwise inaccessible. Encoder 530, block spreader 532, block clusterer 534, and decoder 536 may implement an erasure coding configuration to achieve the requirements of a reliability policy with less overhead than full redundancy. For example, encoder 530, block spreader 532, block clusterer 534, and decoder 536 may implement Reed-Solomon codes, fountain codes, or rateless erasure codes such as online codes, low-density parity check (LDPC) codes, raptor codes, and numerous other coding schemes that are available.

Encoder 530 may receive a data object from storage manager 526 and disassemble the data object into a predetermined number of redundant sub blocks, all associated with the same data object identifier. The predetermined number of data blocks may correspond to a predetermined multiple of a desired spreading width, based on the sum of a minimal spreading requirement and a maximum number of concurrent failures. The maximum concurrent failures tolerance may correspond to the number of storage elements that store data blocks for the data object and are allowed to fail concurrently as determined by the reliability policy. The minimum spreading requirement may correspond to the minimum number of storage elements that must be available to reassemble the data object. Encoder 530 may use an erasure coding configuration to produce the predetermined number of data blocks. In some embodiments, each data block may comprise encoded data of equal size, such as the total data object size divided by a factor equal to a predetermined multiple of the spreading requirement. Some or all data blocks may also include decoding data, such as parity data or other decoding data.

Block spreader 532 may store the predetermined number of redundant data blocks on a number of storage elements which corresponds to the desired spreading width or more. For example, block spreader 532 may store on each storage element a predetermined multiple of data blocks such that the data blocks are evenly distributed among the storage elements. In some embodiments, these storage elements may be split across module storage nodes or even multiple storage racks, storage sites, or other layers of a hierarchical storage architecture. Block spreader 532 may implement a spreading policy that may include, for example, a number of storage elements to receive the blocks, the storage pool from which those storage elements may be selected, and constraints or algorithms for how they are to be distributed (e.g. evenly across elements or nodes, randomly within an acceptable range, or using some other distribution method). In some embodiments, a hierarchical spreading policy may define additional rules for spreading data blocks, such as defining a number of sites, racks, etc. across which the data blocks should be spread. For example, the spreading policy may include a number of blocks per site, blocks per rack, blocks per node, blocks per element, etc. In some embodiments, block spreader 532 may invoke storage path selector 554 to select specific storage elements within a storage pool to receive one or more data blocks as further described below.

Block clusterer 534 may receive a request from storage manager 526 to retrieve a selected data object that has previously been stored through encoder 530 and block spreader 532. Based on the data object identifier, block clusterer 534 may locate a predetermined number of the redundant data blocks that were stored in the storage elements. Block clusterer 534 does not need to be able to retrieve all of the encoded data blocks in order to reassemble the data block, only a subset equal to the minimal spreading requirement. While the likelihood of outright failures corresponding to the failure tolerance is extremely low, there may be service interruptions, delays, resource bottlenecks (processing, memory, bandwidth, etc.), and other considerations that make some storage elements easier or less costly to access. Block clusterer 534 may invoke storage path selector 554 to select specific storage elements among the set of storage elements storing the data blocks corresponding to the selected data object. For example, storage path selector 554 may provide a preferred subset (such as a background subset or foreground subset, depending on the operation) for retrieval or a prioritized list for enabling block clusterer 534 to choose the least costly storage elements from which to retrieve the subset of data blocks.

Decoder 536 may reassemble the selected data object from the subset of data blocks retrieved by block clusterer 534. For example, decoder 536 may apply a decoding algorithm and the decoding data from the data blocks to the encoded data in the data blocks to reassemble the selected data object from the subset of data blocks. The resulting data object may be returned to storage manager 526 and storage interface 520 to respond to a host request or other storage operation.

Storage policy engine 540 may include an interface protocol or set of functions and parameters for receiving, defining, and otherwise managing storage policies for object storage system 500 and/or a broader distributed storage system. For example, storage policy engine 540 may include functions for initiating, storing, modifying, or otherwise manipulating one or more storage policy parameters. The storage policy parameters may then be used by other components in object storage system 500 to effect data management operations, such as erasure coding configurations, spreading policies, blacklist policies, and storage path selection, as well as selection and isolation policies for handling background operations. In some embodiments, storage policy engine 540 may include or interface with a graphical user interface for enabling system administrators to view, modify, and otherwise manage storage policy parameters.

In some embodiments, storage policy engine 540 may include a plurality of hardware and/or software modules configured to use processor 514 and memory 516 to handle or manage defined operations of storage policy engine 540. For example, storage interface 520 may include a system hierarchy model 542, system parameters 544, system cost functions 546, and path selection rules 548. For example, system hierarchy model 542 may define storage paths available to each storage element, system parameters 544 may define the available system management data for calculating system costs, system cost functions 546 may enable numerical modeling of system costs for each storage path, and path selection rules 548 may customize selection of relevant hierarchical components, parameter data, cost functions, comparisons, priorities, blacklists, and isolation policies for making storage path selections. Collectively, system hierarchy model 542, selected system parameters 544, relevant system cost functions 546, and an active group of path selection rules 548 may define a dynamic cost model for selecting storage paths. This dynamic cost model may be implemented through system data collector 550, storage path estimator 552, and storage path selector 554 in support of block spreader 532 and block clusterer 534.

System hierarchy model 542 may include data structures, functions, and interfaces for defining a hierarchical addressing scheme and related storage paths among components, such as from a controller node to the many storage elements that make up object store 580. For example, a storage pool supporting object store 580 may include a large number of storage elements grouped into storage nodes. The storage nodes may be arranged in racks or clusters using common power and networking resources, racks and clusters may be distributed across sites, from different server rooms and buildings, to geographically dispersed data centers. These layers of components, from the lowest hierarchical level of the storage elements themselves, up to one or more top-level controllers, access, or management nodes (sometimes virtualized) responsible for allocating storage requests and resulting storage operations, may define distinct failure points as well as a series of routing decisions for traversing the storage path from the top level to a target storage element. In some embodiments, a configuration data structure reflecting the storage system components, their hierarchy level, and relationship to other components may be stored in configuration data. In some embodiments, system hierarchy model 542 may be inherent in the physical and/or logical arrangement of components and reflected in a hierarchical addressing scheme regardless of whether the model is otherwise stored in a configuration map or similar modeling tool. An example system hierarchical model 542 is further shown and described with regard to FIG. 6.

System parameters 544 may include interfaces, functions, and/or parameters for identifying and selecting system parameters that may be collected and used for dynamic system cost calculations and comparisons. For example, system parameters 544 may include storage parameters, such as capacity, read/write latency, command queue depths, idle time, buffer space, and operational status. System parameters 544 may include quantification of computing resource availability, such as memory resources and processor resources, including special resources like direct memory access transfer buffers or hardware encoders, decoders, or parity engines. System parameters may include network parameters, such as network delay and network bandwidth, which may be measured and quantified for communications between each layer of the hierarchy, as well as aggregated into total values for a complete storage path.

In any given storage system configuration, a variety of system parameters may be available. System parameters 544 may enable the identification and selection from available parameters for supporting system cost functions 546. For example, system parameters 544 may be used to configure system data collector 550 to receive data from particular APIs, libraries, daemons, or services or to query specific data sources for selected parameters. In some embodiments, system parameters 544 may define one or more parameter monitors to be instantiated on one or more system components to collect desired parameter data and provide it to system data collector 550.

System cost functions 546 may include interfaces, functions, and/or parameters for calculating system cost values from one or more parameters. For example, parameters selected from system parameters 544 and collected by system data collector 550 may be variables in one or more cost functions that convert the parameters into a cost function value associated with a storage path of interest. System cost functions 546 may include standard cost models for storage resources, computing resources, and network resources involved in each storage path. System cost functions 546 may generally reduce or simplify a plurality of component level parameters (from any level of the hierarchy) into aggregate cost values for use in comparing costs between storage paths and executing the logical rules associated with path selection.

In some embodiments, one or more system cost functions may include a factor to influence path selection based on one or more policies to avoid specific storage elements. For example, isolation policy 592 may be enforced by including an isolation factor when a type of operation is not supposed to be allocated to a subset committed to another task, such as a background operation. A blacklist policy may be enforced by including a blacklist factor for storage elements on the blacklist (based on prior failed storage attempts). In some embodiments, the policy-based factor may significantly increase the system cost value of a storage element such that it is unlikely to be selected relative to other storage elements.

Path selection rules 548 may include interfaces, functions, and/or parameters for selecting and comparing system cost values to determine a preferred storage path, generally reflecting a storage policy defined for object storage system 500. For example, path selection rules 548 may compare the relative merits of different storage elements and their associated storage paths based on one or more system constraints that the user cares about. In some embodiments, path selection rules 548 may correspond to logical evaluations arranged in ordered decision tree for determining which storage path should be selected among a plurality of viable storage paths in a storage pool. For example, a series of logical rules for path selection may be defined in a rule set data structure to be executed by a rules engine for comparing possible storage paths and storage elements.

In some embodiments, path selection rules 548 may include one or more rules to implement isolation policy 592 for storage elements that have been allocated to a specific task, such as executing a background process. For example, responsive to the initiation or progress of a background process, selection policy 594 may be used to select a subset of data blocks for a data unit to be isolated for use in the background process, such as by background isolation engine 558. Path selection rules 548 may include conditions for applying isolation policy 592 to any given storage path selection for that data unit. In some embodiments, storage elements including data blocks in the background subset may have limited use as storage paths for requests for as long as they remain allocated to the background subset. Path selection rules 548 may provide logic for checking whether a storage element is allocated to the background subset, identifying whether a given data request (storage request or retrieval request) or background request may use the storage element under isolation policy 592, and excluding allocated storage elements for data operations that violate the isolation policy. In some embodiments, path selection rules 548 may merely enable the use of cost models or system cost functions 546 that implement one or more factors for taking isolation policy 592 into consideration in storage path cost calculation and selection.

In some embodiments, path selection rules 548 may be grouped into specific policy sets and a user may be able to select a policy set rather than configuring individual rules. For example, path selection rules 548 may include a quality of service policy, a latency target policy, or a power saving policy.

A quality of service policy may include a rule set for avoiding slow or unavailable storage elements, storage nodes, or other components during retrieval or storage of data requests. For example, the storage path cost values may include measured response time to prior requests sent to each storage element and the comparison will select the subset with the fastest response times in order to reduce overall latency for all requests. The quality of service policy may also include an aggressive blacklisting policy for unresponsive storage elements and other components.

A latency target policy may include a rule set for users and/or processes that issue storage requests requiring low latency. For example, the rule set may select the fastest path, similar to the quality of service policy, but only for users and processes specifically designated to receive low latency treatment, while selecting a slower path for users and processes that do not require low latency (to preserve the faster paths for the low latency requests). In some embodiments, the low latency targets may be monitored and if latency for low latency requests exceeds a threshold value, normal requests may be delayed until the latency targets are again met for low latency requests.

A power saving policy may include a rule set to optimize the power efficiency of the DSS by choosing storage paths that allow for storage and retrieval of data blocks in a power efficient way. For example, when storing a data object in 18 data blocks, where 8 are redundant, the storage paths may be selected to place a subset 5 data blocks in storage elements that can be put off-line to save power, such as a storage node or rack designated to go into a low power mode once the operation is complete. The other 13 data blocks remain available with low latency, of which only 10 are needed for retrieval requests. If needed, the 5 additional storage elements can be put back online or otherwise taken out of low power mode. The rule set may include the logical rules for selecting one or more of the offline storage paths, such as due to failures among the 13 active data blocks or exceeding a latency threshold, and thereby initiating those storage elements to return to active use.

In some embodiments, one or more policy rule sets in path selection rules 548 may include rules for storing redundant data blocks based on processing parameters and the comparative processing intensity of different data blocks, such as host data blocks versus parity data blocks. Some data blocks may require more processing during decoding operations than other data blocks. Some storage paths may be selected because they are associated with a low-level processing (such as host data blocks), while other storage paths may be selected because they are associated high-level processing (such as parity calculation). For example, parity data blocks may intentionally be sent to storage elements that are already associated with a high resource cost (such as high latency) and would not normally be selected over lower latency storage paths. Because of the high resource cost, the parity data block is unlikely to be selected for subsequent storage requests in favor of the data blocks stored to storage elements with a lower resource cost (such as low latency). This policy may essentially reserve the use of high processing cost blocks to situations where the low processing cost blocks can no longer fulfill the incoming requests, which may in turn reduce latency and power consumption, at least until the threshold of needing the high processing cost blocks is passed.

System data collector 550 may include interfaces, functions, and/or parameters for receiving and/or accessing system parameters for use in selecting storage paths and storage elements for redundant data blocks. For example, system data collector 550 may include a service for collecting latency data from storage requests processed through object storage system 500 and components thereof. Read and write operations may generate messages and/or log entries that may be used to calculate elapsed times between the initiating and completion of read or write requests to storage elements and these processing times may be aggregated in a monitoring data store by system data collector 550.

In some embodiments, components at various levels of the hierarchy may be configured to collect performance data regarding storage operations, workload, processor use, memory use, network delay, bandwidth, and/or system status. System data collector 550 may be configured to receive system parameter values corresponding to some or all system parameters through a reporting or messaging function and/or access to data structures or memory locations storing these values. System data collector 550 may aggregate collected information in monitoring data for use by storage path estimator 552 and/or storage path selector 554. In some embodiments, some parameter values may be refreshed upon request or responsive to an action, such as completing the processing of a prior storage request. Some parameter values may be refreshed periodically at a time interval that provides acceptable accuracy for cost model calculation without overburdening the system with traffic related to parameter value messages or queries.

In some embodiments, system data collector 550 may be configured for communication with parameter monitors. For example, the parameter monitors may include hardware and/or software data collectors disposed in individual system components, such as storage elements, storage nodes, top switches, controllers, network devices, etc. for collecting parameter data from their respective components and/or adjacent components. The parameter monitors may be selectively installed in networked components and registered with system data collector 550 for aggregating system parameter values in monitoring data. As with some configurations of system data collector 550, the parameter monitors may be configured to monitor specific transactions, mine log data, and/or access system parameters already generated and stored by their host system components for aggregation in monitoring data.

Storage path estimator 552 may include interfaces, functions, and/or parameters for calculating cost values for each storage element and/or related storage path for use in selecting storage paths and storage elements for redundant data blocks. For example, storage path estimator 552 may implement system cost functions 546 based on system parameters 544 collected by system data collector 550 and stored in monitoring data to calculate and store storage path costs for each storage element in a storage pool (for storage commands) or containing a redundant data block for a requested data object (for retrieval commands). In some embodiments, storage path estimator 552 may implement a dynamic cost model that may aggregate a plurality of system parameters into a multivariable transfer function for quantifying a system cost value. For example, rather than directly comparing latency values measured for each storage element, the relative system cost value for each storage element may be a weighted composite of a plurality of cost factors selected from storage costs, computing costs, and/or network costs. In some embodiments, system hierarchy model 542 may enable the factors to be calculated at each hierarchy level and selected for each storage path cost based on the hierarchical addressing scheme. For example, based on a storage element's hierarchical address, parameter values for the storage element, storage node, rack, and site may be selected for the storage path calculation. Note that storage path estimator 552 may use the most recent system parameters available to estimate the storage path costs, but the costs may only be estimates and the actual costs incurred by the resulting storage transaction on the selected storage paths may be different. As described above, in some embodiments, policy status of the storage element, such as isolating a background subset or storage elements on the blacklist, may inject a factor into the storage cost models that modify the storage cost value to me more expensive. In some embodiments, a policy-based status may replace the storage cost value calculation with a policy enforcement value, such as a value above the normal range of values calculated for storage elements not isolated or on the blacklist.

In some embodiments, storage path estimator 552 may include a cost calculator that executes system cost functions 546 that embody a particular cost model. For example, storage path estimator 552 may select a defined set of system parameters and one or more system cost functions for a path selection task. Storage path estimator 552 may provide the parameter sets for each storage path and the selected system cost function(s) to the cost calculator. The cost calculator may process each parameter set to generate a system cost value for each storage element and store the system cost value and a storage element identifier (such as its hierarchical address) for each storage path in a table, array, or similar data structure in a data store.

Storage path selector 554 may include interfaces, functions, and/or parameters for selecting the set of storage elements to receive redundant data blocks for storage requests and/or the subset of storage elements from which redundant data blocks are retrieved for retrieval requests. For example, storage path selector 554 may use the system cost values calculated by storage path estimator 552 to evaluate which storage elements should be used by block spreader 532 or block clusterer 534. Storage path selector 554 may include a cost comparator for comparing the relative system cost values of the candidate storage elements and related storage paths. For example, assuming a system cost value where a lower cost is better than a higher cost, the cost comparator may sequentially compare the system cost values from an array of storage path costs and/or sort those values into an ordered list, so that the set of storage elements with the lowest cost and meeting the number of storage elements needed for the operation may be determined. Storage path selector 554 may then return the selected set of storage elements to block spreader 532 or block clusterer 534 for use in completing the related operations. Based on a selected system cost function or dynamic cost model that returns a relative storage cost value, the cost comparator may identify the lowest cost (or highest cost) storage paths for storage path selector 554.

In some embodiments, storage path selector 554 may include a selection rules engine for making more complex logical determinations to implement a storage policy. For example, the selection rules engine may execute a set of path selection rules, such as path selection rules 548, using storage path costs and a decision tree to select storage elements. A set of path selection rules may include a plurality of logical steps that eliminate or select storage elements based on considerations beyond their relative storage path costs alone. For example, selection rules may enforce special considerations of storage elements to use or not use due to load, maintenance status, or power-saving mode. Selection rules may use a classification of a data unit as low cost (host data) or high cost (parity data) to enforce different selection criteria. In some embodiments, storage path costs may include multiple values for different cost types (such as storage costs, computing costs, and network costs) for each storage path and selection rules may determine which values are used and how they are weighted for the cost comparator. For example, a given storage policy may select storage elements with the lowest storage costs that do not also have computing costs or network costs over particular thresholds.

Background operations manager 556 may include an interface protocol or set of functions and parameters for initiating and managing one or more background operations, such as delete operations, garbage collection, replications, etc. For example, background operations manager 556 may support a plurality of functions used by storage interface 520 to implement storage operations that may be handled outside of foreground processing of host data requests. In some embodiments, host data requests, such as storage requests and retrieval requests, may be handled in accordance with storage policies that assure defined performance levels for those requests. But those foreground requests may still be supported by a variety of background operations necessary for the ongoing maintenance, management, and performance of the system. Some host operations, such as a delete request, may generate both foreground and background operations. For example, a logical delete operation may be performed as a foreground operations responsive to the host request and involve only metadata store 570 and the background delete operation may subsequently modify the deleted objects in object store 580. In some embodiments, background operations manager 556 may utilize metadata manager 524 for metadata functions and storage manager 526 for media functions in support of one or more background operations. Encoder 530, block spreader 532, block clusterer 534, decoder 536, storage path estimator 552, and storage path selector 554 may also support storage and retrieval of redundant data blocks supporting one or more background operations.

Background isolation engine 558 may include an interface protocol or set of functions and parameters for enforcing isolation policy 592 for one or more background operations. For example, background isolation engine 558 may be configured to identify which background operations are subject to isolation policy 592 and may include functions that enhance background operations manager 556 for those functions. Background isolation engine 558 may be configured to use selection policy 594 to determine which data blocks and storage elements are used for any given background operations subject to isolation policy 592. Background isolation engine 558 may be configured to determine which foreground operations, if any, may be executed using storage elements allocated to background operations. While the example background isolation engine 558 is described with reference to storage element isolation, in other embodiments isolation policy 592 may be implemented at another level of system hierarchy 542, such as storage nodes, storage racks, storage clusters, etc.

In some embodiments, isolation policy 292 and/or selection policy 294 may be embodied in one or more configuration files, tables, or similar data structures for identifying parameters used by background isolation engine 558. For example, isolation policy 292 may include identifiers for one or more background operations that may be supported by isolation policy 292 and one or more isolation rules to be enforced during an operating period of the background operation. Similarly, selection policy 294 may include one or more selection rules to use in selecting the storage elements for background operations and/or influencing their selection by storage path selector 554.

In some embodiments, background isolation engine 558 may include a plurality of hardware and/or software modules configured to use processor 514 and memory 516 to handle or manage defined operations of background isolation engine 558. For example, background isolation engine 558 may include an operation identifier 560, a background subset selector 562, an isolation rules engine 564, a metadata aggregator 566, and an operations data manager 568. Operation identifier 560 may be configured to identify pending operations, such as host/foreground and/or background operations in an operation queue, for use in initiating background isolation engine 558 and/or evaluating isolation rules for determining whether an operation will be executed against the background subset or foreground subset of redundant data blocks. Background subset selector 562 may be configured to apply selection policy 594 to the set of redundant data blocks for a data unit targeted by a background operation to determine what subset of the redundant data blocks will be allocated to the background operation and subject to isolation policy 592 for an operating period. Isolation rule engine 564 may be configured to evaluate whether any given operation during the operating period may be executed using the background set of data blocks or whether the operation should be directed to other data blocks, such as the remaining set of data blocks for the data unit. Metadata aggregator 566 may be configured to aggregate metadata for a next selection process during the operating period for use by background subset selector 562. Operation data manager 568 may be configured to allocate one or more data structures, such as interim operation data 598, to manage metadata for the background operation during the operating period.

Operation identifier 560 may include interfaces, functions, and/or parameters for identifying data or background operations that may be subject to isolation policy 592. For example, operation identifier 560 may parse one or more operating queues and/or receive notification of pending operations from other components to identify which background operations are pending and whether other operations are targeting storage elements currently subject to an isolated background operation. In some embodiments, operation identifier 560 may identify a background operation targeting a selected data object and pass an object identifier and an operation identifier to background subset selector 562. In some embodiments, once operation identifier 560 has identified the selected data object and initiated an isolation period for the background processing, operation identifier 560 may monitor for additional operations, such as data requests or other background operations, targeting the isolated storage elements and pass those requests to isolation rule engine 564. In some embodiments, isolation rule engine 564 may be implemented through storage path selector 554 and operation identifier 560 may only manage identification of background requests without a role in identifying requests for enforcing isolation policy 592.

Background subset selector 562 may include interfaces, functions, and/or parameters for applying selection policy 594 to the set of data blocks and identifying corresponding system components, such as storage elements, for a data unit to determine the subset of data blocks to be allocated to the background operation and the system components to be isolated. For example, background subset selector 562 may receive an identifier for a data object and access metadata for the data object to determine the number and location of redundant data blocks stored in object store 580. In some embodiments, background subset selector 562 may determine from the erasure coding scheme the number of data blocks necessary to recover the data object and identify a number of data blocks to be allocated to the background subset and the foreground subset to support their respective operations. For example, where a complete data object may be necessary for the background operations, the number allocated to the background operation must at least equal the minimum number required to recover the data object. The remaining or foreground subset may generally need to include at least the minimum number required to recover the data object in order to service host data requests. For some background operations, recovery of the data object may not be required and less than the minimum number to recover may be allocated to the background subset. For some background operations, the number of storage elements in the background subset may be equal to or larger than the spread width of the erasure encoding scheme of distributed storage system 500.

Background subset selector 562 may be configured to use a variety of selection parameters for determining which storage elements and corresponding data blocks should be allocated to the background subset. For example, selection parameters such as storage capacity of the storage elements, data object size, available processing or network capacity, and/or other system costs for allocating the background process to a given storage element may be used to determine the background subset. In some embodiments, storage path estimator 552 may be used by background subset selector 562 to provide an aggregate system cost parameter for each storage element and selection policy 594 may include one or more logical rules for selecting the background subset based on comparison of the system cost values. In some embodiments, background subset selector 562 may determine selection parameters directly from metadata store 570 or receive one or more selection parameters from other system services or data structures for aggregating system performance data. In some embodiments, selection parameters for selection of the next background subset may be aggregated during the background process, such as for a delete operation that tracks progress through a metadata crawl. For example, see metadata aggregator 566 and operation data manager 568 below.

In some embodiments, background subset selector 562 may be configured to implement a selected selection policy 594 based on a background operation type. For example, selection policy 594 may implement one or more of a storage capacity selection policy, a round robin selection policy, and/or an operation completion policy for delete operations. A storage capacity selection policy may choose a background subset of storage elements of which the largest storage capacity would be made available after execution of the background operation. A round robin selection policy may use a time-based and/or sequential window to select a predetermined number of storage elements and then shift or repeat the selection window along an ordered set of the redundant data blocks. The ordered set may be organized according to storage hierarchy to assure that a desired number of data blocks from each storage node or other level of the hierarchy are selected. An operation completion policy may maximize the complete deletion of all corresponding data blocks for a data unit prior to starting another deletion operation and/or may allow for concurrent deletions but favor completing a data unit where practical given other constraints. An operation completion policy may also provide a metadata reduction policy, as after the removal of all data blocks the corresponding metadata can be removed from metadata store 570. In some embodiments, selection policy 594 may be self-balancing, as the background operation may impact the selection parameters such that the same storage elements are unlikely to be selected for the next round of the background operation.

Isolation rule engine 564 may include interfaces, functions, and/or parameters for applying isolation policy 592 to data and/or background operations targeting the system components corresponding to the selected data units. For example, once the background subset has been selected, storage element identifiers corresponding to the storage elements storing each of the selected data units may be identified as subject to isolation policy 592 and isolation policy 592 may be applied to all incoming data requests and/or background requests targeting those storage elements. In some embodiments, isolation rule engine 564 may be invoked for each request to the set of isolated system components and one or more logical rules defined in isolation policy 592 may be applied to determine whether isolated storage elements may be used. For example, an incoming read request for a data object including a data block on one of the isolated storage elements may violate isolation policy 592 and the isolated storage element may be made unavailable to the read request, requiring the read request to use a combination of redundant data blocks that avoids the isolated storage elements, wait for the background operating period to lapse and the isolated storage elements to become available again, or deny the request.

In some embodiments, isolation rule engine 564 may enforce isolation rules by selectively applying cost modifiers 596 that cause storage path estimator 552 and storage path selector 554 to avoid isolated storage elements in accordance with isolation policy 592. For example, cost modifiers 596 may increase the relative system cost of the storage path to isolated storage elements for requests that violate the isolation policy. So, in the example above, incoming read requests with data blocks in the isolated storage elements would have cost modifiers 596 applied to the storage path system cost values for the isolated storage elements, resulting in their costs being higher than other storage elements for the data blocks. In many cases, this may result in the read request completing execution using the remaining storage elements that are not isolated and, therefore, do not have cost modifiers 596 applied. In some embodiments, isolation policy 592 may be integrated in or influence path selection rules 548 and enable isolation policy 592 to be balanced with other factors for determining the set of storage elements to be used for any given data request. For example, high priority retrieval requests may be able to overcome isolation policy 592 and use an isolated storage element in the event that there are not otherwise enough data blocks available to retrieve the data object. This may be enforced through path selection rules 548 and cost modifiers 596 making isolated elements relatively more costly, but still within a selectable threshold for some types of requests. In some embodiments, cost modifiers 596 may vary based on the type of data request or background request being processed. For example, a higher cost modifier may be applied to storage requests than retrieval requests for the same isolated storage elements.

In some embodiments, isolation policy 592 may be selected from a number of isolation policy options. For example, isolation policy 592 may reduce the number of competing processes for the isolated storage elements by reducing or no longer accepting incoming storage requests, reducing or no longer accepting incoming retrieval requests, reducing or no longer accepting background requests other than the background operation that triggered the isolation, and/or only accepting requests related to the triggering background operation. In some embodiments, each of these options may be embodied in one or more isolation policy rules and/or cost modifiers 596 based on the type of incoming request.

Metadata aggregator 566 may include interfaces, functions, and/or parameters for aggregating metadata to support background subset selector 562. For example, metadata aggregator 566 may aggregate selection parameters during the background operation to be used by background subset selector 562 for a next iteration of the background operation. In some embodiments, metadata aggregator 566 may provide aggregated parameters to system data collector 550 and/or directly to background subset selector 562. For example, as a background operation crawls metadata store 570 to perform one or more aspects of the background operation, metadata aggregator 566 may use counters, pointers, or similar data structures to track one or more metadata values, such as values related to progress of the background operation and/or results thereof, such as freed capacity. When the operating period of the background operation completes, metadata aggregator 566 may report the metadata-based values to system data collector 550 and/or background subset selector 562. For example, progress through a background delete process may be used as selection parameters for a next iteration of the background delete process.

Operation data manager 568 may include interfaces, functions, and/or parameters for storing operation data, such as a subset of metadata relevant to a background operation, to support background operations manager 556 in more efficiently completing the background operation with fewer rewrites to metadata store 570. For example, operation data manager 568 may allocate interim operation data 598 in isolation data store 590 to store a data structure for tracking background operation progress and/or metadata values related to an ongoing background operation. The interim operation data store may include a local memory location or storage device for tracking operation data without using metadata store 570 or related processing, memory, and/or network resources. In some embodiments, operation data manager 568 may be implemented for idempotent metadata to avoid concerns over redundant metadata and reintegration into metadata store 570 when the operation is complete. For example, for a background delete operation, operation data manager 568 may use an in-memory table of deleted data blocks (i.e. parts of a deleted data object). The table in memory may be used for conducting the delete operation and persisted on a regular interval (e.g. every x seconds) or other trigger to metadata store 570. In some embodiments, the predetermined operating time interval for these transfers may be determined from an interval parameter in a configuration file or similar user-configurable parameter value. The table may include a delete time stamp for each data block and/or storage element. If all delete time entries for the storage elements with data blocks of a deleted data object comprise a delete time which is more recent than the last modification time of the data object, then background operations manager 556 may determine that all data blocks of the data object have been completely deleted. The background delete operation may then be persisted in metadata store 570 by deleting or rewriting the metadata entry for the data object.

Memory 516 may include additional logic and other resources (not shown) for processing object data requests, such as modules for generating, queueing, and otherwise managing object data requests. Processing of an object data request by storage interface 520 may include any number of intermediate steps that yield at least one data request to the distributed storage system.

Figure 6:
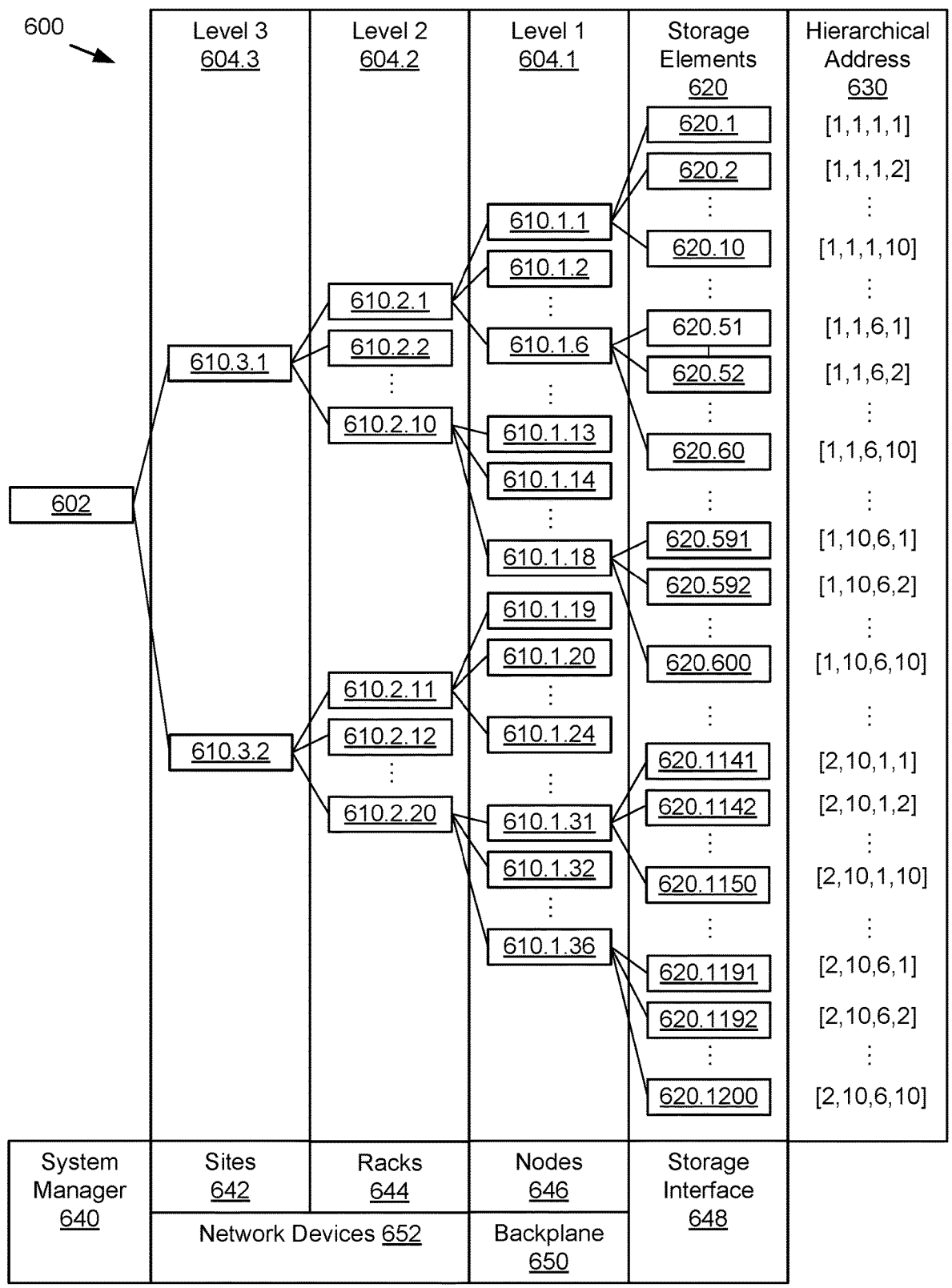
FIG. 6 schematically illustrates example storage system components in a hierarchical addressing configuration.

FIG. 6 shows an example hierarchical model of a distributed storage system 600, similar to distributed storage system 1 and its components, as described in FIGS. 1-4. The various levels 604 of the hierarchical configuration of the components of distributed storage system 600 form a tree structure and the path from controller node 602 to each storage element 620 forms a unique storage path associated with that storage element.

At the first hierarchy level 604.1, storage elements 620 are grouped into first components 610.1, such as storage nodes 646. In the example shown, each storage node component 610.1 may include ten storage elements 620, such as drives, and the 1200 storage elements correspond to 120 distinct storage nodes. In some embodiments, storage elements 620 may be communicatively connected to storage nodes 646 over their respective storage interfaces 648.

At the second hierarchy level 604.2, storage elements 620 may be further grouped into second components 610.2, such as storage racks 644. In the example shown, each storage rack component 610.2 may include six storage node components 610.1 and the 120 storage nodes may be grouped into 20 distinct storage racks. In some embodiments, storage nodes 646 may be connected to storage racks 644 by a backplane 650 including one or more network connections from a rack switch or similar component to each storage node.

At the third hierarchy level 604.3, storage elements 620 may be further grouped into third components 610.3, such as sites 642. In the example shown, each site component 610.3, which may represent a site network configuration and related equipment, may include ten storage rack components 610.2 and the 20 storage racks may be grouped into two distinct sites. In some embodiments, storage racks 644 may be connected into sites 642 by network devices 652, such as routers, switches, and network management devices.

A system manager 640 may be hosted in controller 602 for overseeing storage requests to distributed storage system 600. In some embodiments, controller 602 may host elements similar to those shown in memory 516 of FIG. 5 for managing storage requests and encoding them to and decoding them from an object data store comprised of distributed storage elements 620.

In some embodiments, distributed storage system 600 may use hierarchical addresses 630 for identifying individual storage elements. Each storage element 620 may comprise a corresponding unique storage element identifier that is a hierarchical address. For example, the hierarchical address of storage element 620.1 is [1,1,1,1] and the hierarchical address of storage element 620.1200 is [2,10,6,10].

In some embodiments, each hierarchical address may be comprised of several component identifiers that identify the corresponding hierarchical configuration for each storage element 620. These component identifiers may each occupy a position that is a hierarchy level identifier. For example, each hierarchical address may be an array of four numerals. The left most or first numeral in the array may be a hierarchy level identifier and contain a component identifier for components 610.3 in hierarchy level three. The next numeral in the array moving right may be a hierarchy level identifier and contain a component identifier for components 610.2 in hierarchy level two. The next numeral on the array moving right again may be a hierarchy level identifier and contain a component identifier for components 610.1 in hierarchy level one. The right most numeral is a component identifier for storage elements 620 and may be considered not to be a hierarchy level identifier or to identify hierarchy level zero, the storage elements themselves.

Hierarchical addresses 630 may identify a storage path by reference to the specific components at each hierarchy level that data blocks will pass through between controller 602 and each storage element 620. The example shown includes three hierarchy levels resulting in a four-number array of hierarchy level identifiers to describe the address and storage path. Other hierarchical storage models may include more or fewer hierarchy levels and the number of identifiers in the address may generally equal the number of hierarchy levels plus one for the storage element identifiers themselves. For example, some configurations may have only two hierarchy levels and others may have four or more. Example hierarchy level identifiers may include a storage element identifier, a storage node identifier, a storage rack identifier, a storage cluster identifier, a storage site identifier, and a storage system identifier, though other hierarchy level identifiers and corresponding component identifiers are possible.

Figure 7:
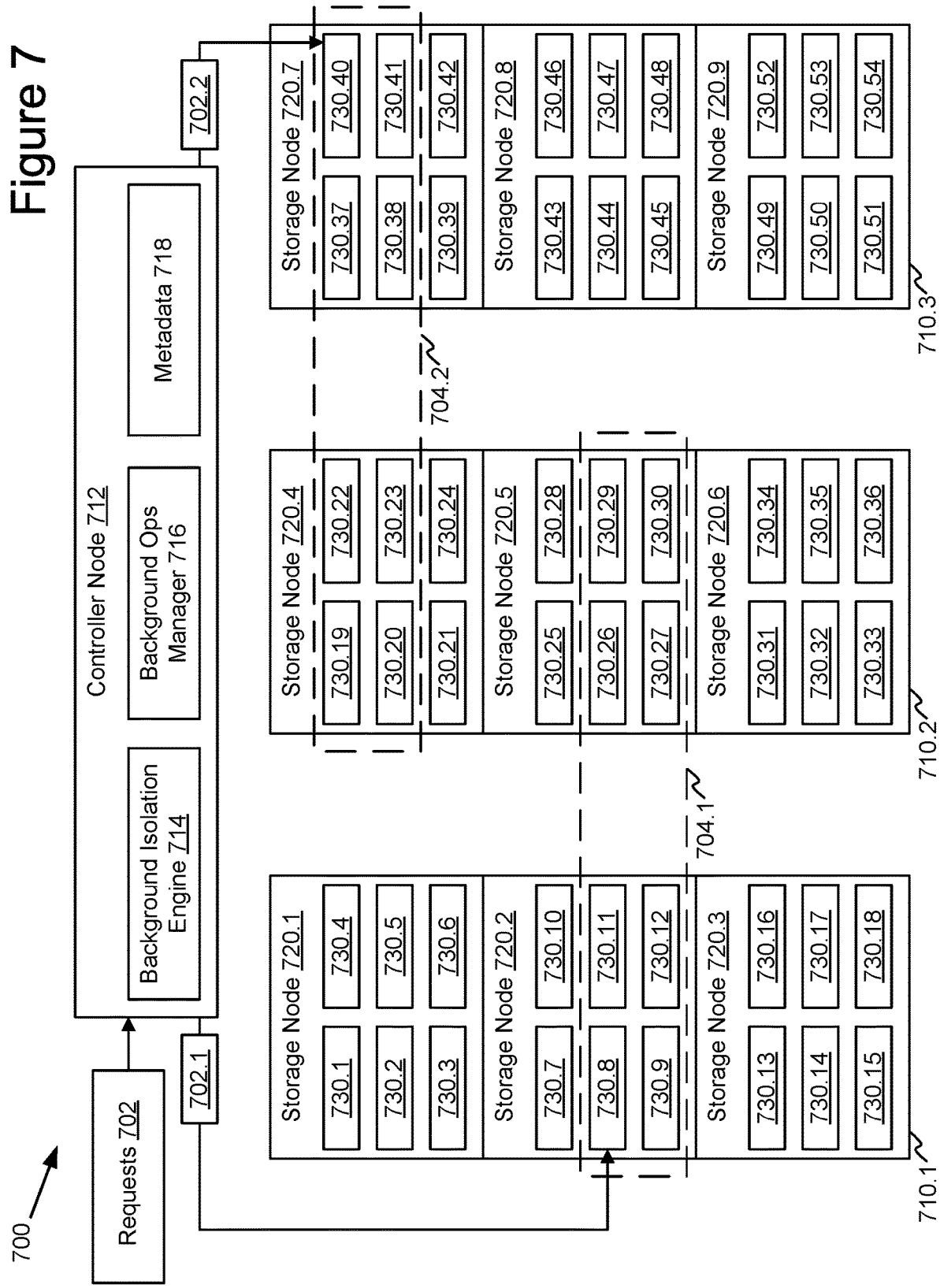
FIG. 7 schematically illustrates an example distributed storage system with background and foreground subsets of redundant data blocks.

FIG. 7 shows an example distributed storage system 700, similar to distributed storage system 1 and its components, as described in FIGS. 1-4, and operating similarly to object storage system 500, as described in FIG. 5. As shown, distributed storage system 700 includes storage racks 710, which include storage nodes 720, which include storage elements 730. Storage racks 710.1-710.3 are in communication with controller node 712. Controller node 712 may receive requests 702, which may include data requests, such as foreground storage requests and retrieval requests. Controller node 712 may receive or generate one or more background requests for a background operation subject an isolation policy and enforce that isolation policy against incoming requests 702.

Controller node 712 may include a background isolation engine 714, a background operations manager 716, and metadata 718, which may be accessed through a metadata store. Background isolation engine 714, background operations manager 716, and metadata 718 may be configured to operate as described above for background isolation engine 558, background operations manager 556, and metadata store 570, respectively.

Background operations manager 716 may identify a background operation, such as a background delete operation, to be performed on a target data object. The target data object may correspond to a set of redundant data blocks 704 stored on storage elements 730.8, 730.9, 730.11, and 730.12 in storage node 720.2, storage elements 730.19, 730.20, 730.22, and 730.23 in storage node 720.4, storage elements 730.26, 730.27, 730.29, and 730.30 in storage node 720.5, and storage elements 730.37, 730.38, 730.40, and 730.41 in storage node 720.7. Based on the identified background operation and target data object, background isolation engine 714 may select a background subset 704.1 for use in executing the background operation, leaving a foreground subset 704.2 to handle most requests 702.

The storage elements 730.8, 730.9, 730.11, and 730.12 in storage node 720.2 and storage elements 730.26, 730.27, 730.29, and 730.30 in storage node 720.5 containing background subset 704.1 may comprise an isolation set of system components and not receive requests during an operating period for the background request in accordance with an isolation policy that limits the number and or types of requests that may be directed to the isolated storage elements. For example, the isolation policy may allow read requests to be executed against isolated storage elements, but require that write requests be directed to storage elements that are not isolated. In another example, all foreground data requests may be denied access to the isolated storage elements unless a request cannot be completed without using one or more isolated storage elements. So, for example, request 702.1 may not violate the isolation policy and may be directed to isolated storage element 730.8, while request 702.2 may violate the isolation policy, be prevented from accessing isolated element 730.8, and instead be directed to storage element 730.40 for processing. Meanwhile, background operations manager 716 may complete the background operation using background subset 704.1 and metadata 718.

Figure 8:
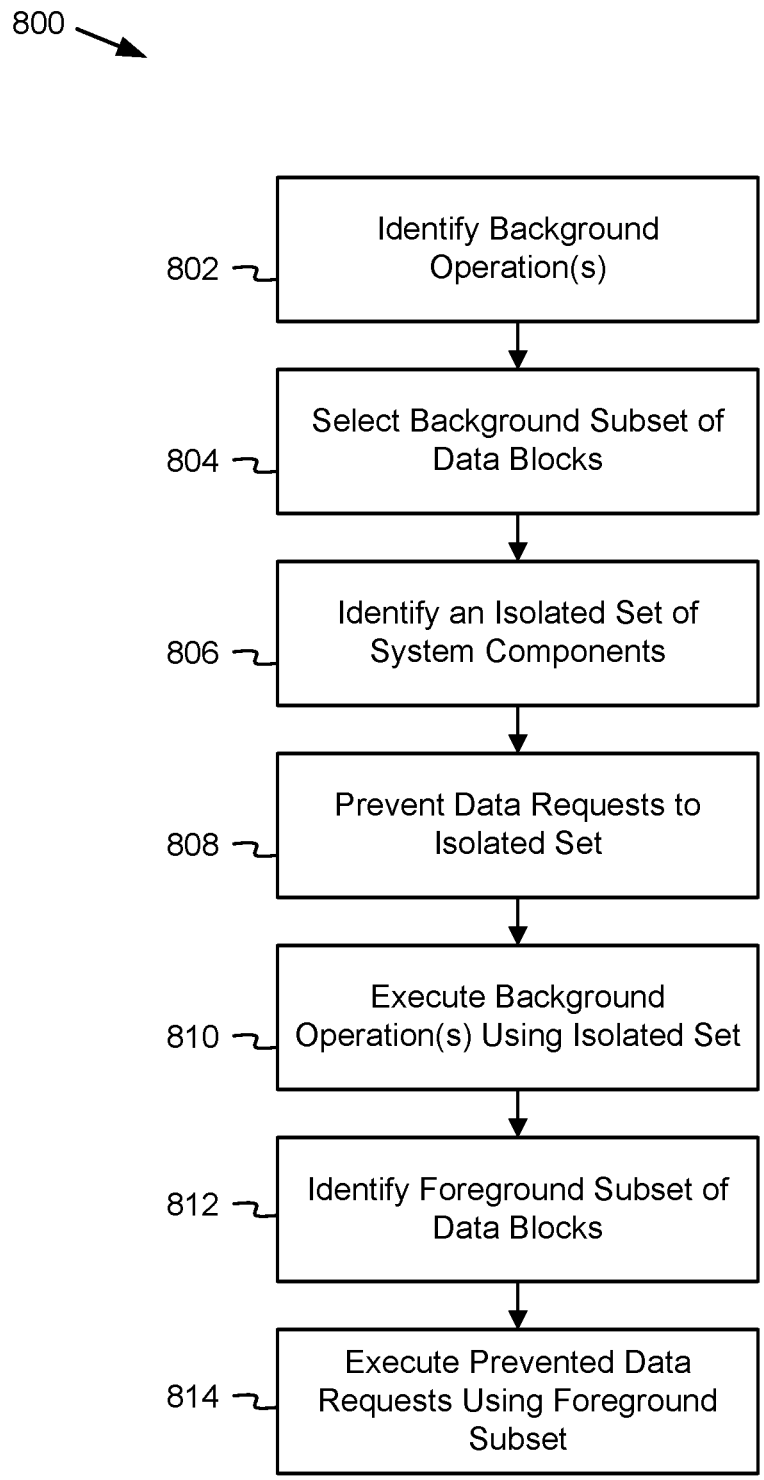
FIG. 8 illustrates an example method for selectively preventing data requests to selected data blocks during background operations.

As shown in FIG. 8, the object storage system 500 may be operated according to an example method for executing operations with an isolated background subset, i.e. according to method 800 illustrated by blocks 802-812 in FIG. 8.

At block 802, one or more background operations may be identified for execution. For example, a background isolation engine may identify a background operation subject to an isolation policy.

At block 804, a background subset of data blocks relevant to the background operation may be selected. For example, the background isolation engine may select a subset of data blocks corresponding to a portion of the data blocks for a data object targeted by the background operation.

At block 806, an isolated set of system components may be identified based on the background subset of data blocks. For example, each storage element containing at least one data block of the background subset may be identified in an isolated set of storage elements that are less than all storage elements in the storage pool or containing data blocks for the target background operation.

At block 808, a data request to the isolated set may be prevented in accordance with the isolation policy. For example, the background isolation engine may enforce a rule that some or all foreground data requests may not use the storage elements in the isolated set during a background operation period, where the isolated set would otherwise have been in the storage pool for completing the request.

At block 810, the background operation or operations may be executed using the background subset in the isolated set. For example, the background isolation engine may not prevent and/or may support accelerated execution of the background operation using the background subset.

At block 812, a foreground subset may be identified from the subset of system components, such as storage elements, in the relevant storage pool. For example, storage elements that are not in the background subset but are still relevant to the processing of an incoming request may be identified as a foreground subset, such as storage elements containing redundant data blocks for the data object in a retrieval request or the remaining storage elements available in the pool for a new storage request.

At block 814, a data request prevented by the isolation policy from using the background subset may be executed using the foreground subset. For example, a data storage request may use storage elements not in the background subset or a retrieval request may use the storage elements containing the remaining data blocks for the target data object.

Figure 9:
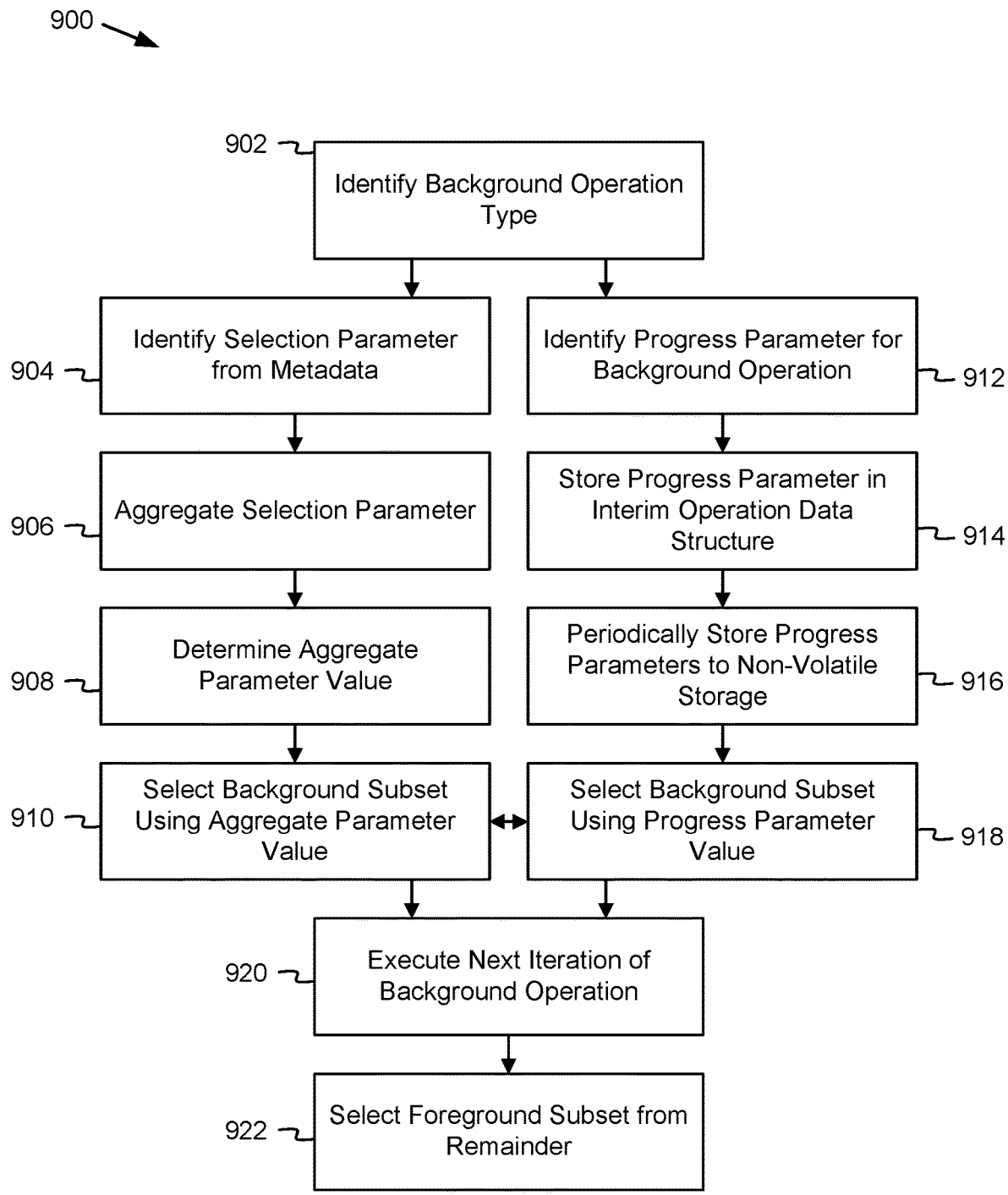
FIG. 9 illustrates an example method for selecting background subsets for background operations.

As shown in FIG. 9, the object storage system 500 may be operated according to an example method for selecting a background subset for a background operation, i.e. according to method 900 illustrated by the blocks 902-922. In some embodiments, method 900 may operate in conjunction with one or more blocks of method 800 in FIG. 8.

At block 902, a background operation may be identified by operation type. For example, a background isolation engine may identify a background delete operation as a delete operation type corresponding to a specific set of target metadata and progress parameters. In some embodiments, block 902 may be initiated by execution of the background operation using a previously selected background subset. In some embodiments, the operation type may correspond to selection parameters that may be determined from metadata during the background operation and method 900 may proceed to block 904. In some embodiments, the operation type may correspond to progress parameters for monitoring progress of the overall background operation during a plurality of sub-operation operating periods, such as iteratively processing portions of the redundant data blocks of a data unit until all data blocks are processed, and method 900 may proceed to block 912. In some embodiments, both block 904 (and subsequent blocks) and block 912 (and subsequent blocks) may be executed for the same operation in parallel.

At block 904, a selection parameter based on metadata may be identified. For example, the background isolation engine may identify a metadata field, such as data unit size or storage element capacity, relevant to the selection policy used for identifying the next background subset.

At block 906, the selection parameter may be aggregated and/or updated during the background operation. For example, as the background operation proceeds through data blocks in the background subset, the background isolation engine may aggregate or update the changes in data unit size and/or storage element capacity.

At block 908, the aggregate parameter value may be determined. For example, the background isolation engine may aggregate the results of the metadata changes that occurred during the current operating period of the background operation and store the aggregate metadata value for use as a selection parameter.

At block 910, the next background subset may be selected using the aggregate parameter value as a selection parameter. For example, the background isolation engine may apply the selection policy to the updated metadata values for each of the storage elements in determining the next background subset to operate on in the next operating period. The aggregate parameter value may be one of several values contributing to the selection logic and may operate in conjunction with block 918.

At block 912, a progress parameter for the background operation may be identified. For example, the background isolation engine may track data blocks completed for a delete operation in order to determine when all data blocks have been deleted and the corresponding data object metadata may be updated.

At block 914, the progress parameter for the background operation may be stored in an interim operation data structure. For example, the background isolation engine may create a table in memory for receiving the progress parameter as each data block is completed.

At block 916, the current progress parameter values may be stored to non-volatile memory periodically during the operating period. For example, the interim operation data structure from memory or updates thereto may be periodically written by the background isolation engine to the metadata store or another data store for retaining background operation data between completions of operations (and resulting modification of related metadata).

At block 918, the next background subset may be selected using the progress parameter value as a selection parameter. For example, the background isolation engine may apply the selection policy to the remaining data blocks based on the progress parameter identifying completed data blocks and thereby determine the next background subset to operate on in the next operating period. The progress parameter value may be one of several values contributing to the selection logic and may operate in conjunction with block 910.

At block 920, the next iteration of the background operation may be executed using the selected background subset. For example, the selection policy may select a new set of data blocks from a target data unit and return to block 902. If the background operation has not completed, the background operation type does not change and the aggregate parameter value and/or progress parameter may continue from the prior iteration.

At block 922, a foreground subset may be selected from the remainder. For example, the new background subset may define a new foreground subset of storage elements and corresponding data blocks that are not in the background subset subject to the isolation policy.

Figure 10:
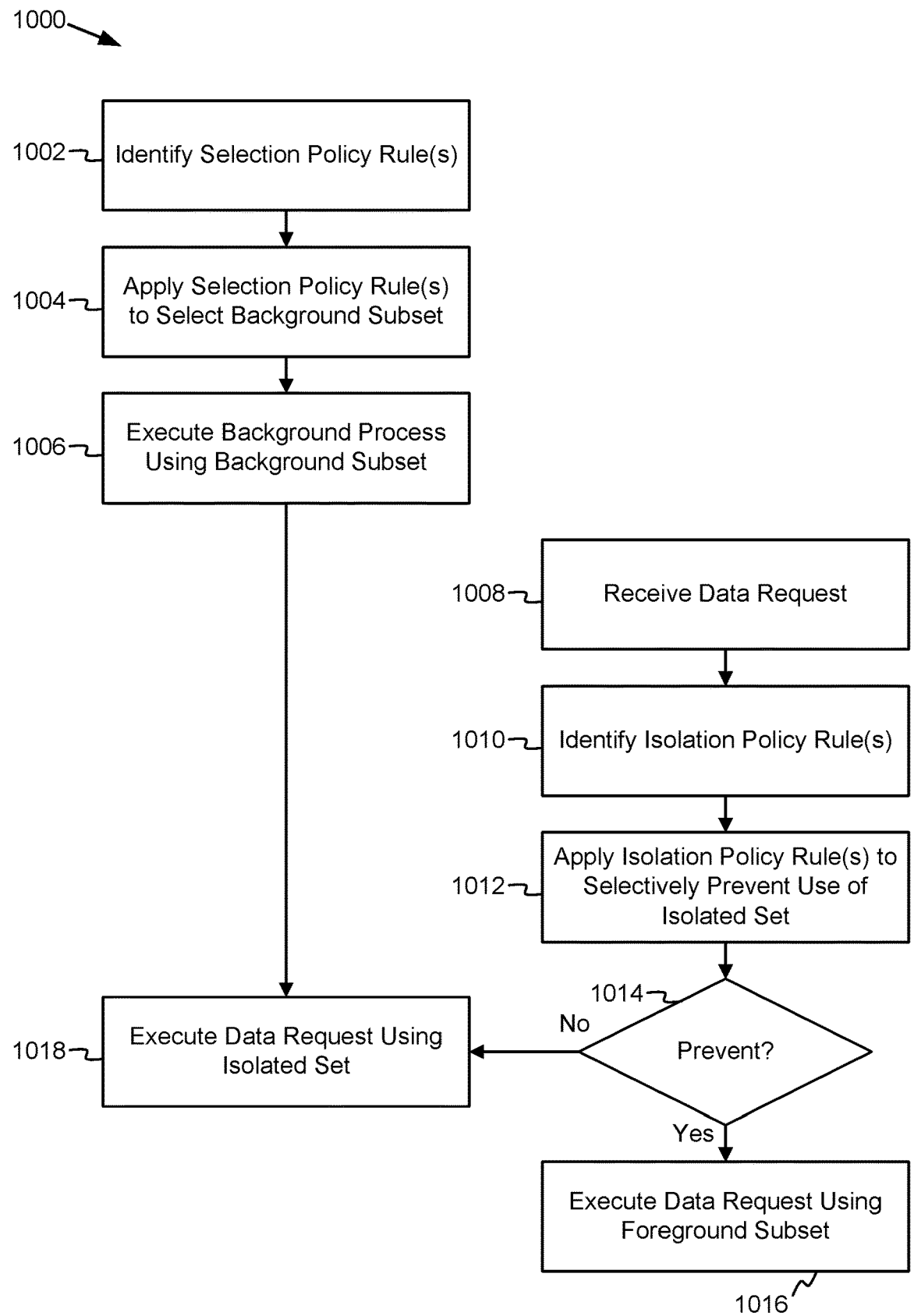
FIG. 10 illustrates an example method for using policy rules for selectively preventing data requests to selected data blocks during background operations.

As shown in FIG. 10, the object storage system 500 may be operated according to an example method for applying storage policies to background subset selection and isolation, i.e. according to method 1000 illustrated by blocks 1002-1018 of FIG. 10.

At block 1002, selection policy rules may be identified. For example, a background isolation engine may include a selection policy made up of a plurality of selection policy rules that may be applied to set of redundant data blocks and corresponding system components to determine a background subset for a particular background operation and operating period.

At block 1004, the selection policy rules may be applied to a set of data blocks corresponding to a target data unit. For example, the background isolation engine may receive a background operation request targeting a particular data object and the background isolation engine may apply the appropriate selection rules for the background operation to the set of data blocks corresponding to the target data object.

At block 1006, the background process may be executed using the background subset. For example, the background isolation engine may initiate the background process targeting the data blocks in the background subset of storage elements. In some embodiments, the background processing may continue during an operating period for the background process or the portion of the background process directed to the background subset.

At block 1008, a data request may be received. For example, a host data request, such as a storage request or retrieval request, related to data objects in the storage pool including the background subset may be received by a controller or access node. This may occur during the operating period of the background process executing against the background subset.

At block 1010, isolation policy rules may be identified. For example, the background isolation engine may include an isolation policy made up of a plurality of isolation policy rules that may be applied to data requests that could be processed by system components in the isolated set or containing the background subset.

At block 1012, the isolation policy rules may be applied to the isolated system components containing the background subset to selectively prevent use of the isolated set for some requests. For example, the background isolation engine may identify incoming requests where storage paths that include the isolated set may be considered, such as storage requests to the storage pool including those components or retrieval requests for data object with data blocks accessed through those storage paths. The isolation policy may be applied based on the type of incoming request and may prevent some or all incoming requests of a certain type or based on other logical rules for isolating the background set.

At block 1014, application of the isolation policy rules may determine whether to prevent the use of the isolated set or not. If yes, the data request is prevented from using the isolated and method 1000 may proceed to block 1016. If no, the data request is not prevented from using the isolated set and method 1000 may proceed to block 1018.

At block 1016, the data request may be executed using only the foreground subset. For example, storage paths for the storage request may be selected from the foreground subset that remains once the isolated set are excluded. In some embodiments, if the data request cannot be completed using the foreground subset, it may be rejected or delayed until the operating period of the background process lapses.

At block 1018, the data request may be executed using both the isolated set and/or the entire available/appropriate storage pool. For example, all storage paths may be available as if the isolated set were not isolated. In some embodiments, the isolation policy rules may only reduce the likelihood of selecting storage elements in the background subset and some data requests may be executed using one or more storage elements from the background subset. Note that blocks 1008-1018 may execute a plurality of times based on a number of received data requests during the operating period for the background process using the background subset.

In some embodiments, during the operating period for executing the background process at block 1006, the background process may be executing on the background subset at block 1006 simultaneously with prevented data requests being executed using the foreground subset at 1016. For example, during the operating period, data requests may be received by the system and allocated between the two subsets to allow both the background process and some or all foreground data requests to proceed in parallel using different sets of components, each containing sufficient redundant subblocks to complete the respective operations.

Figure 11:
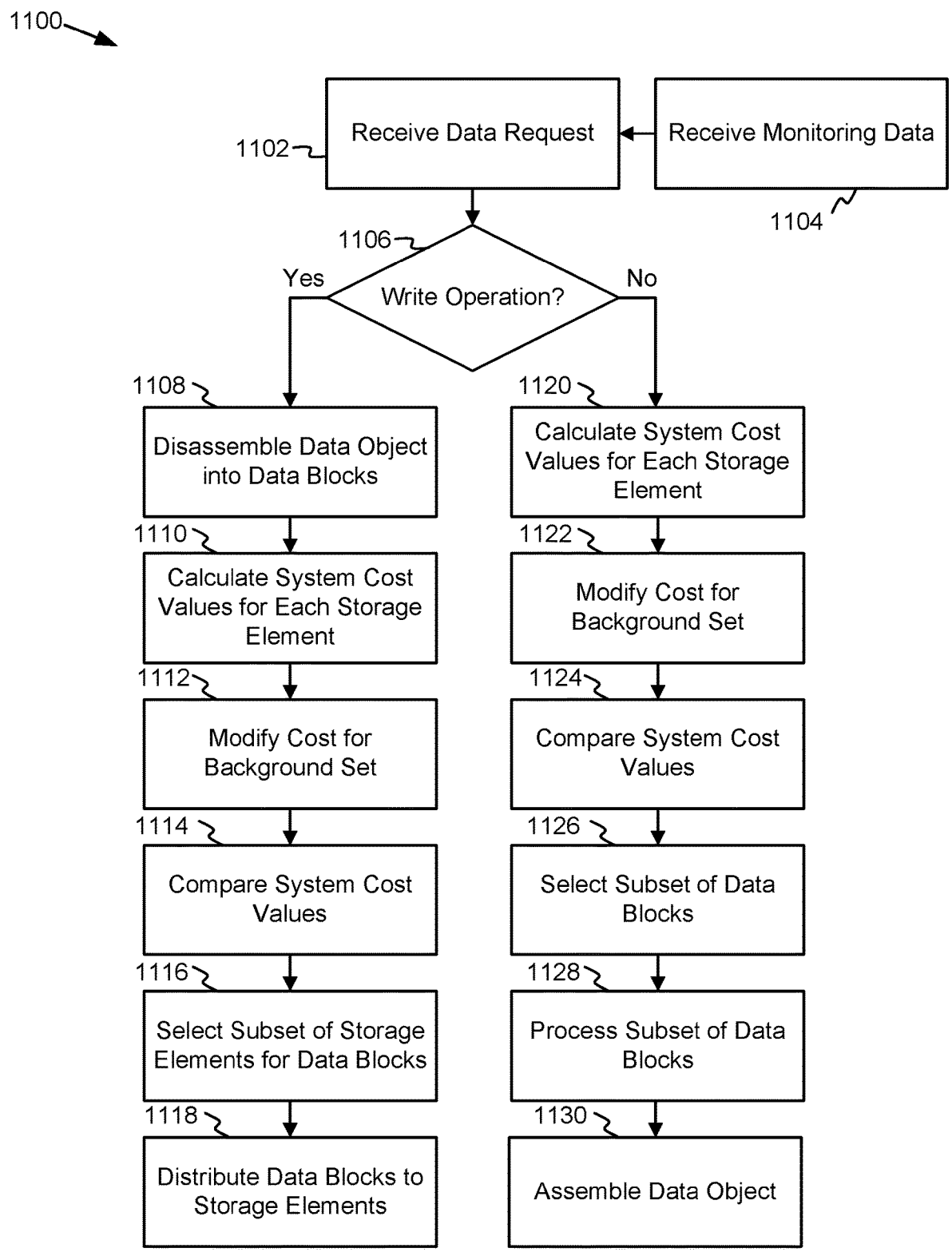
FIG. 11 illustrates an example method for dynamically selecting storage elements in a hierarchical distributed storage system with selective allocation of data blocks to background operations.

As shown in FIG. 11, the object storage system 500 may be operated according to an example method for selecting storage elements based on an isolation policy for the background subset, i.e. according to the method 1100 illustrated by the blocks 1102-1130 of FIG. 11.

At block 1102, a data request may be received. For example, a client request handler may receive an object storage request (write) or retrieval request (read) that references one or more data objects for storage or retrieval.

At block 1104, monitoring data may be received including one or more system parameters. For example, a system data collector may receive updated system parameters for storage elements in a storage pool relevant to the incoming data request. In some embodiments, block 1104 may operate concurrently to block 1102 with data request handling proceeding in parallel with monitoring system parameters relevant to one or more system cost values.

At block 1106, whether the received storage request is a write operation may be evaluated. For example, the storage request handler may determine whether the storage operation is a put request (storage or write operation) or a get request (retrieval or read operation). If no, the storage request may include a read operation and method 1100 may proceed to block 1120. If no, the storage request may include a write operation and method 1100 may proceed to block 1108.

At block 1108, the data object may be disassembled into data blocks. For example, an encoder may divide the data object into a predetermined number of redundant data blocks using an erasure coding configuration.

At block 1110, system cost values may be calculated for each storage element in a storage pool that will receive the data object. For example, a storage path estimator may identify each storage element in the storage pool and calculate an associated system cost value for the storage path to reach that storage element.

At block 1112, the system cost values may be modified based on an isolation policy. For example, the background isolation engine may check the isolation rules to determine whether they apply to the request and, if so, storage path estimator and/or storage path selector may receive a cost modifier to factor into the system cost function for isolated storage elements. In some embodiments, modifying the system cost value may include replacing the system cost value with a higher cost constant that indicates isolation status for the storage element.

At block 1114, system cost values may be compared to determine the relative costs of each storage element. For example, a storage path selector may compare the system cost values to sort the storage elements according to their relative costs and enable them to be grouped by higher or lower costs. Isolated components may have a higher cost value than components that are not isolated.

At block 1116, a subset of storage elements in the storage pool may be selected to receive the data blocks. For example, the storage path selector may apply a path selection rule to select a number of storage elements equaling a desired spreading width and having the lowest relative costs.

At block 1118, the data blocks may be distributed to the selected subset of storage elements. For example, a block spreader may store the data blocks to the selected subset of storage elements based on a spreading policy.

At block 1120, system cost values may be calculated for each storage element in the set of storage elements containing data blocks for the data object. For example, the storage path estimator may identify each storage element with data blocks associated with the data object identifier and calculate an associated system cost value for the storage path to reach that storage element.

At block 1122, the system cost values may be modified based on the isolation policy. For example, the background isolation engine may check the isolation rules to determine whether they apply to the request and, if so, storage path estimator and/or storage path selector may receive a cost modifier to factor into the system cost function for isolated storage elements. In some embodiments, modifying the system cost value may include replacing the system cost value with a higher cost constant that indicates isolation status for the storage element.

At block 1124, system cost values may be compared to determine the relative costs of each storage element. For example, the storage path selector may compare the system cost values to sort the storage elements according to their relative costs and enable them to be grouped by higher or lower costs.

At block 1126, a subset of data blocks equal to a number of data blocks needed to recover the data object may be selected based on their corresponding storage elements. For example, the storage path selector may apply a path selection rule to select a number of storage elements equaling a minimal spreading requirement and having the lowest relative costs.

At block 1128, the data blocks may be retrieved from the selected subset of storage elements. For example, a block cluster may read the data blocks from the selected subset of storage elements and provide them to a decoder for assembly.

At block 1130, the data object may be assembled from the retrieved data blocks. For example, the decoder may use the erasure coding configuration to decode the data in the data blocks and reassemble the original data object for the storage request.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
a plurality of storage elements configured to store a plurality of data blocks, wherein:
the plurality of data blocks includes a data unit set having a plurality of redundant data blocks corresponding to a data unit; and
the data unit set includes a predetermined number of redundant data blocks disassembled from the data unit and distributed among the plurality of storage elements; and
a background isolation engine configured to:
identify a background operation targeting the data unit;
select a background subset of data blocks from the data unit set of the plurality of data blocks, wherein:
the background subset includes a first selection of redundant data blocks from which the data unit may be recovered;
a foreground subset includes a second selection of redundant data blocks from which the data unit may be recovered; and
the foreground subset excludes the background subset;
identify an isolated set of system components containing the background subset of data blocks;
selectively prevent data requests from using the isolation set of system components during the background operation; and
execute, using the data unit assembled from the background subset of data blocks in the isolated set of system components, the background operation.

2. The system of claim 1, wherein the background isolation engine is further configured to:
identify the foreground subset of redundant data blocks from the data unit set of the plurality of data blocks; and
selectively execute, using the foreground subset, the data requests selectively prevented from using the isolated set of system components.

3. The system of claim 1, further comprising:
an encoder configured to disassemble the data unit into the predetermined number of redundant data blocks comprising the data unit set for the data unit;
a block spreader configured to distribute the predetermined number of redundant data blocks to the plurality of storage elements;
a block clusterer configured to:
retrieve the background subset from the isolated set of system components for executing the background operation; and
retrieve the foreground subset for executing data requests prevented from using the isolated set of system components; and
a decoder configured to assemble the data unit from the foreground subset without using the background subset.

4. The system of claim 3, wherein the background isolation engine is further configured to:
select the background subset for a plurality of background operations during an operating period; and
select the foreground subset for a plurality of prevented data requests during the operating period.

5. The system of claim 1, further comprising:
a storage policy engine configured to identify at least one isolation policy rule for selectively preventing data requests from using the isolated set of system components, wherein:
the background isolation engine is further configured to select for prevention, using the at least one isolation policy rule, selected data requests from a plurality of data requests directed to the isolated set of system components during the background operation; and
the at least one isolation policy rule is selected from:
selecting a first portion of incoming storage requests for execution using the isolated set of system components and preventing a second portion of incoming storage requests from using the isolated set of system components;
preventing all incoming storage requests from using the isolated set of system components;
selecting a first portion of incoming retrieval requests for execution using the isolated set of system components and preventing a second portion of incoming retrieval requests from using the isolated set of system components;
preventing all incoming retrieval requests from using the isolated set of system components;
preventing all incoming storage requests and retrieval requests from using the isolated set of system components; and
preventing all incoming data requests that are not related to the background operation from using the isolated set of system components.

6. The system of claim 1, further comprising:
a storage policy engine configured to identify at least one selection policy rule for selecting the background subset, wherein:
the background isolation engine is further configured to select, using the at least one selection policy rule, the background subset from the data unit set of the plurality of data blocks; and
the at least one selection policy rule is selected from:
selecting the background subset based on a storage capacity after execution of the background operation;
selecting the background subset sequentially from a moving subset of the predetermined number of redundant data blocks from the data unit set;
selecting the background subset at predetermined operating time intervals;
selecting the background subset based on at least one parameter determined by a background operation type for the background operation; and
selecting the background subset based on at least one parameter in metadata corresponding to progress through the background operation.

7. The system of claim 1, wherein the background isolation engine is further configured to:
identify at least one selection parameter from a metadata store related to the background operation;
aggregate the at least one selection parameter into at least one aggregate parameter value; and
use the at least one aggregate parameter value to select the background subset.

8. The system of claim 1, wherein the background isolation engine is further configured to:
store at least one progress parameter in an interim operation data store during execution of the background operation; and
use the at least one progress parameter to select the background subset.

9. The system of claim 1, further comprising:
a storage path estimator configured to:
calculate at least one system cost value for each storage element of the plurality of storage elements storing the data unit set of data blocks; and
modify the at least one system cost value for each storage element including at least one data block in the background subset; and
a storage path selector configured to select, based on a comparison of the at least one system cost value for each storage element, a request data set, wherein:
the request data set for the background operation includes storage elements including the background subset; and
the request data set for prevented data requests excludes storage elements including the background subset.

10. A computer-implemented method, comprising:
storing a plurality of data blocks in a plurality of storage elements, wherein:
the plurality of data blocks includes a data unit set having a plurality of redundant data blocks corresponding to a data unit; and
the data unit set includes a predetermined number of redundant data blocks disassembled from the data unit and distributed among the plurality of storage elements;
identifying a background operation targeting the data unit;
selecting a background subset of data blocks from the data unit set of the plurality of data blocks, wherein:
the background subset includes a first selection of redundant data blocks from which the data unit may be recovered;
a foreground subset includes a second selection of redundant data blocks from which the data unit may be recovered; and
the foreground subset excludes the background subset;
identifying an isolated set of system components containing the background subset of data blocks;
selectively preventing data requests from using the isolated set of system components during the background operation; and
executing, using the data unit assembled from the background subset of data blocks in the isolated set of system components, the background operation.

11. The computer-implemented method of claim 10, further comprising:
identifying the foreground subset of the data unit set of the plurality of data blocks; and
selectively executing, using the foreground subset, data requests selectively prevented from using the isolated set of system components.

12. The computer-implemented method of claim 10, further comprising:
disassembling the data unit into the predetermined number of redundant data blocks comprising the data unit set for the data unit;
distributing the predetermined number of redundant data blocks to the plurality of storage elements;
retrieving the background subset for executing the background operation;
retrieving the foreground subset for executing data requests prevented from using the background subset; and
assembling the data unit from the foreground subset without using the isolated set of system components.

13. The computer-implemented method of claim 12, further comprising:
selecting the background subset for a plurality of background operations during an operating period; and
selecting the foreground subset for a plurality of prevented data requests during the operating period.

14. The computer-implemented method of claim 13, further comprising:
executing, using the background subset, the plurality of background operations during the operating period; and
executing, using the foreground subset, the plurality of prevented data requests during the operating period, wherein executing the plurality of background operations is simultaneous with executing the plurality of prevented data requests during the operating period.

15. The computer-implemented method of claim 10, further comprising:
identifying at least one isolation policy rule for selectively preventing data requests from using the isolated set of system components; and
selecting for prevention, using the at least one isolation policy rule, selected data requests from a plurality of data requests directed to the isolated set of system components during the background operation, wherein the at least one isolation policy rule is selected from:
selecting a first portion of incoming storage requests for execution using the isolated set of system components and preventing a second portion of incoming storage requests from using the isolated set of system components;
preventing all incoming storage requests from using the isolated set of system components;
selecting a first portion of incoming retrieval requests for execution using the isolated set of system components and preventing a second portion of incoming retrieval requests from using the isolated set of system components;
preventing all incoming retrieval requests from using the isolated set of system components;
preventing all incoming storage requests and retrieval requests from using the isolated set of system components; and
preventing all incoming data requests that are not related to the background operation from using the isolated set of system components.

16. The computer-implemented method of claim 10, further comprising:
identifying at least one selection policy rule for selecting the background subset; and
selecting, using the at least one selection policy rule, the background subset from the data unit set of the plurality of data blocks, wherein the at least one selection policy rule is selected from:
selecting the background subset based on storage capacity after execution of the background operation;
selecting the background subset sequentially from a moving subset of the predetermined number of redundant data blocks from the data unit set;
selecting the background subset at predetermined operating time intervals;
selecting the background subset based on at least one parameter determined by a background operation type for the background operation; and
selecting the background subset based on at least one parameter in metadata corresponding to progress through the background operation.

17. The computer-implemented method of claim 10, further comprising:
- identifying at least one selection parameter from a metadata store related to the background operation;
- aggregating the at least one selection parameter into at least one aggregate parameter value; and
- using the at least one aggregate parameter value to select the background subset.

18. The computer-implemented method of claim 10, further comprising:
- storing at least one progress parameter in an interim operation data store during execution of the background operation; and
- using the at least one progress parameter to select the background subset.

19. The computer-implemented method of claim 10, further comprising:
- calculating at least one system cost value for each storage element of the plurality of storage elements storing the data unit set of data blocks;
- modifying the at least one system cost value for each storage element including at least one data block in the background subset; and
- selecting, based on a comparison of the at least one system cost value for each storage element, a request data set, wherein:
  - the request data set for the background operation includes storage elements including the background subset; and
  - the request data set for prevented data requests excludes storage elements including the background subset.

20. A system, comprising:
- a plurality of storage elements configured to store a plurality of data blocks, wherein:
  - the plurality of data blocks includes a data unit set having a plurality of redundant data blocks corresponding to a data unit; and
  - the data unit set includes a predetermined number of redundant data blocks disassembled from the data unit and distributed among the plurality of storage elements;
- means for identifying a background operation targeting the data unit;
- means for selecting a background subset of data blocks from the data unit set of the plurality of data blocks, wherein:
  - the background subset includes a first selection of redundant data blocks from which the data unit may be recovered;
  - a foreground subset includes a second selection of redundant data blocks from which the data unit may be recovered; and
  - the foreground subset excludes the background subset;
- means for identifying an isolated set of system components containing the background subset of data blocks;
- means for selectively preventing data requests from using the background subset during the background operation; and
- means for executing, using the data unit assembled from the background subset, the background operation.

* * * * *